United States Patent [19]

Kajita

[11] Patent Number: 5,457,540

[45] Date of Patent: Oct. 10, 1995

[54] IMAGE PROCESSING METHOD AND APPARATUS IN WHICH IDENTIFICATION INFORMATION IS ADDED BASED ON IMAGE DENSITY

[75] Inventor: Koji Kajita, Yokohama, Japan

[73] Assignee: Canon Kabushiki Kaisha, Tokyo, Japan

[21] Appl. No.: 996,692

[22] Filed: Dec. 24, 1992

[30] Foreign Application Priority Data

Jan. 6, 1992 [JP] Japan ..................................... 4-000104
Feb. 28, 1992 [JP] Japan ..................................... 4-043897

[51] Int. Cl.$^6$ ................................................. H04N 1/21
[52] U.S. Cl. ........................... 358/296; 358/298; 358/450; 358/458; 347/3
[58] Field of Search ........................... 358/296, 298, 358/450, 458; 355/201; 347/3

[56] References Cited

U.S. PATENT DOCUMENTS

| | | | |
|---|---|---|---|
| 4,709,274 | 11/1987 | Tanioka | 358/283 |
| 4,739,377 | 4/1988 | Allen | 355/133 |
| 4,891,666 | 1/1990 | Gordon | 355/133 |
| 5,149,140 | 9/1992 | Mowry, Jr. et al. | 283/93 |

FOREIGN PATENT DOCUMENTS

| | | | |
|---|---|---|---|
| 079153 | 5/1983 | European Pat. Off. | H04N 1/46 |
| 342060 | 11/1989 | European Pat. Off. | G03G 21/00 |
| 3229616 | 2/1984 | Germany | H04N 1/02 |

*Primary Examiner*—Peter S. Wong
*Assistant Examiner*—Randy W. Gibson
*Attorney, Agent, or Firm*—Fitzpatrick, Cella, Harper & Scinto

[57] ABSTRACT

An image processing apparatus adds information to read image signals and arranges a mark indicative of a position where the information is added so that the additional information can be easily extracted. An image processor processes full-color image signals from a line sensor and a binarization circuit binarizes the signals using a pseudo half-tone processing. A density judgment circuit judges the density of the image signals and controls a modulator which adds additional information. The modulator refers to the contents of a ROM and changes dot positions in the binarized image signals based on the referred information and adds the additional information to the image signals. A FIFO compensates for image signals delayed by the density judgment circuit.

36 Claims, 22 Drawing Sheets

FIG. 12B

EXAMPLE ( ODD NUMBER INTERVAL )

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| INPUT OF IMAGE SIGNALS | 1 | x | x | x | 0 | x | x | 0 | x | x | 1 | x | x | 0 | x | x | 0 | x | x | 1 | x | x | 0 | x | x | 1 | x | 0 |
| OUTPUT FROM 2501-4 | 0 | x | x | x | 1 | x | x | 0 | x | x | 0 | x | x | 0 | x | x | 1 | x | x | 0 | x | x | 0 | x | x | 0 | x | 1 |
| OUTPUT FROM 2504-2 | 0 | x | x | x | 1 | x | x | 1 | x | x | 0 | x | x | 1 | x | x | 1 | x | x | 0 | x | x | 0 | x | x | 0 | x | 0 |
| OUTPUT FROM 2501-8 | 0 | x | x | x | 0 | x | x | 1 | x | x | 0 | x | x | 1 | x | x | 0 | x | x | 0 | x | x | 1 | x | x | 0 | x | 0 |
| OUTPUT FROM 2504-3 | 1 | x | x | x | 1 | x | x | 0 | x | x | 1 | x | x | 0 | x | x | 1 | x | x | 1 | x | x | 0 | x | x | 1 | x | 0 |
| OUTPUT FROM 2503 | 0 | x | x | x | 0 | x | x | 1 | x | x | 0 | x | x | 1 | x | x | 0 | x | x | 0 | x | x | 1 | x | x | 0 | x | 1 |
| OUTPUT FROM 2505-2 | 0 | x | x | x | 0 | x | x | 0 | x | x | 0 | x | x | 0 | x | x | 0 | x | x | 0 | x | x | 1 | x | x | 0 | x | 0 |
| OUTPUT FROM 2505-3 | 1 | x | x | x | 1 | x | x | 0 | x | x | 0 | x | x | 0 | x | x | 0 | x | x | 1 | x | x | 0 | x | x | 0 | x | 0 |
| OUTPUT FROM 2501-12 | 0 | x | x | x | 0 | x | x | 0 | x | x | 0 | x | x | 0 | x | x | 0 | x | x | 0 | x | x | 0 | x | x | 1 | x | 1 |
| OUTPUT OF IMAGE SIGNALS | 1 | x | x | x | 0 | x | x | 0 | x | x | 1 | x | x | 0 | x | x | 1 | x | x | 1 | x | x | 0 | x | x | 0 | x | 0 |

FIG. 20

Bit 3 ----------------------------------------
Bit 2 ----------------------------------------
Bit 1 ----------------------------------------
Bit 0 ----------------------------------------
Mark ━━━━━━━━━━━━━━━━━━━━━━━━━━━━━━━━━━━━
Bit 0 ----------------------------------------
Bit 1 ----------------------------------------
Bit 2 ----------------------------------------
Bit 3 ----------------------------------------
      ----------------------------------------

⋮                    ⋮

Bit 3 ----------------------------------------
Bit 2 ----------------------------------------
Bit 1 ----------------------------------------
Bit 0 ----------------------------------------
Mark ━━━━━━━━━━━━━━━━━━━━━━━━━━━━━━━━━━━━
Bit 0 ----------------------------------------
Bit 1 ----------------------------------------
Bit 2 ----------------------------------------
Bit 3 ----------------------------------------

IMAGE PROCESSING METHOD AND APPARATUS IN WHICH IDENTIFICATION INFORMATION IS ADDED BASED ON IMAGE DENSITY

BACKGROUND OF THE INVENTION

1. Field of the Invention

The present invention relates to an image processing method and apparatus applicable to an image forming apparatus for color printing (printing thousands of colors) such as a color printer, a color copying machine or a color facsimile apparatus.

2. Related Art

Conventionally, the full-color printers, full-color copying machines and full-color facsimile apparatuses have been put into practical use as output devices for color printing. With price reductions of these apparatuses and an improvement in quality of output images, a problem has resulted that originals which rightfully should not be copied can be easily duplicated using these machines. For this reason, a method of adding specific information such as a manufacturer's serial number of each copying machine to an output image at copying time to specify the copying machine by the serial number detected from the output image has been proposed in U.S. patent application Ser. No. 07/856,996 (filed on Mar. 24, 1992) and U.S. patent application Ser. No. 07/951,087 (filed on Sep. 25, 1992).

However, in the conventional art, an extra signal added to the image data acts as noise, degrading the quality of the output image. Especially, this degradation of image quality occurs in devices using binarization processing i.e. a pseudo half-tone processing such as Dither method or Error Diffusion method, further, in many cases, the image degradation is conspicuous.

More specifically, the conventional devices cannot adjust the density of the additional information to an inconspicuous level upon adding the information, accordingly, the additional information becomes noise in the image, degrading the quality of the output image. Further, it is inconvenient for the purpose of this arrangement that a user can recognize the additional information with the naked eye.

SUMMARY OF THE INVENTION

In consideration of the above situation, the present invention has as its object to solve the aforementioned problems.

Another object of the present invention is to provide an image processing method and apparatus which prevents degradation of image quality upon adding predetermined information to a dot image.

According to the present invention, the foregoing object is attained by providing an image processing apparatus comprising generating means for generating a plurality of dot data, detecting means for detecting an interval of two dots formed in accordance with the dot data generated by the generating means, and control means for controlling the interval of the two dots, wherein the interval controlled by the control means represents a predetermined information which is not included in a dot image formed in accordance with the dot data generated by the generating means.

Another object of the present invention is to provide an image processing method and apparatus which add predetermined information to a color dot image with little influence upon the quality of the color dot image.

According to the present invention, the foregoing object is attained by providing an image processing apparatus comprising generating means for generating a plurality of kinds of color dot data dot-sequentially, detecting means for detecting an interval of two dots of the same kind of color formed in accordance with the color dot data generated by the generating means, and control means for controlling the interval of the two dots of the same kind of color, wherein the interval controlled by the control means represents a predetermined information which is not included in a dot image in accordance with the color dot data generated by the generating means.

A further object of the present invention is to provide an image processing method and apparatus which controls addition of a predetermined information to an image data in accordance with a range of the image data.

According to the present invention, the foregoing object is attained by providing an image processing apparatus comprising generating means for generating image data, judging means for judging whether a level of the image data is in a predetermined range, adding means for adding a predetermined information on an image represented by the image data, and control means for controlling addition by the adding means in accordance with judgment by the judging means.

Yet another object of the present invention is to provide an image processing method and apparatus for preservation of image density.

According to the present invention, the foregoing object is attained by providing an image processing apparatus comprising generating means for generating image data, and processing means for processing the image data generated by the generating means and outputting a reproduction signal for forming an image, wherein the processing means includes adding means for adding a predetermined information to the image and control means for controlling density of the image after the addition by the adding means so that the density of the image before the addition by the adding means is substantially preserved.

Another object of the present invention is to provide a copying apparatus and a printing apparatus having a novel function.

Further object of the present invention is to provide an image processing method for real-time processing.

Still another object of the present invention is to provide a high-speed image processing method.

Another object of the present invention is rationalization of a circuit configuration.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 is a diagram showing as a sample additional information added on an image in the fifth embodiment.

DETAILED DESCRIPTION OF THE PREFERRED EMBODIMENTS

Preferred embodiments of the present invention will be described in detail in accordance with the accompanying drawings.

First Embodiment

A first embodiment as an example where the present invention is applied to an ink-jet output type full-color copying apparatus will be described below.

Figure 1:
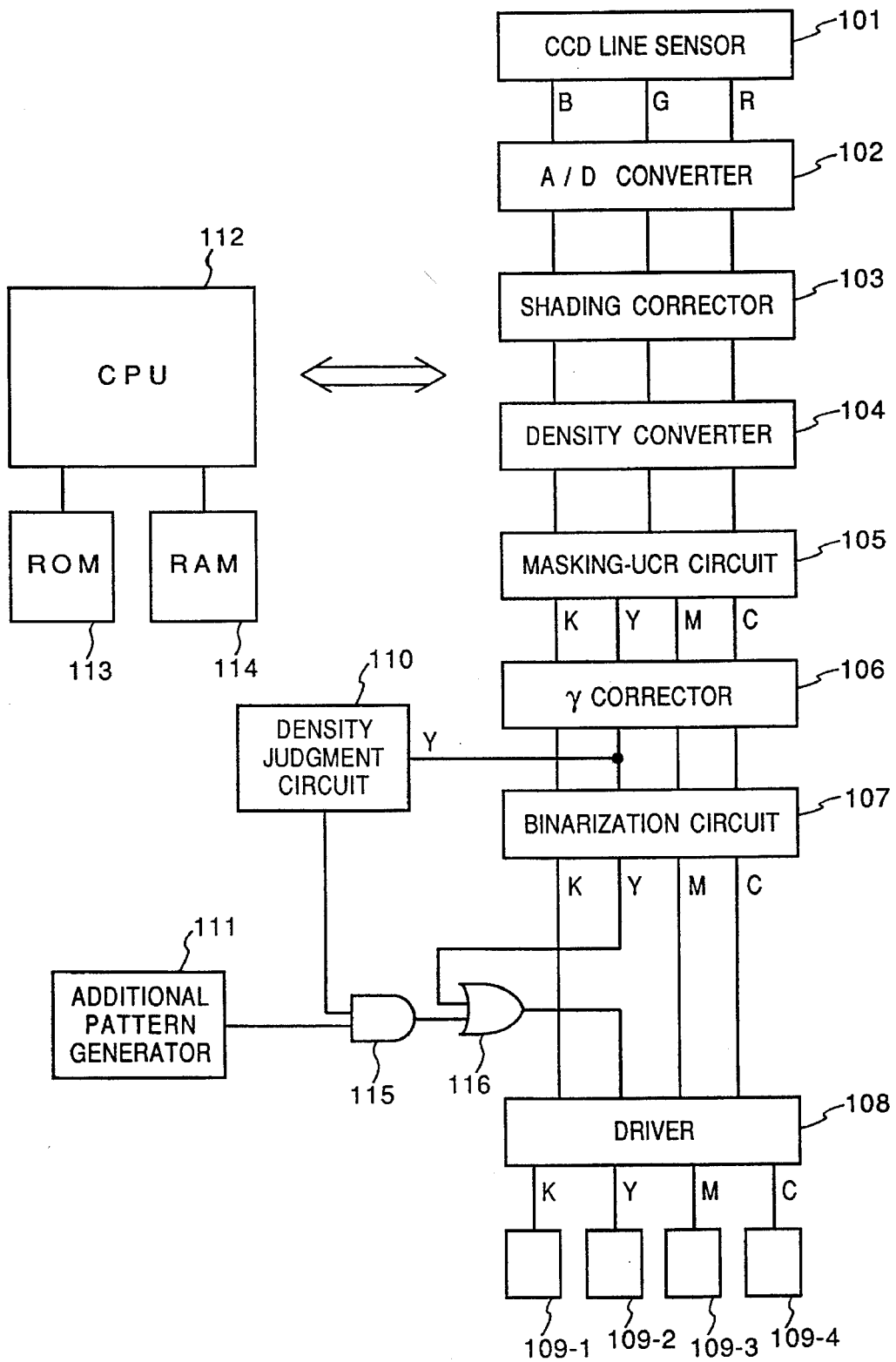
FIG. 1 is a block diagram showing a configuration of an image processing portion of a full-color copying apparatus according to a first embodiment.

FIG. 1 is a block diagram showing a configuration of an image processing portion of the full-color copying apparatus according to the first embodiment. In FIG. 1, reference numeral 101 denotes a CCD line sensor; 102, an A/D converter; 103, a shading corrector; 104, a density converter; 105, a masking-UCR circuit; 106, a γ corrector; 107, a binarization circuit; 108, an ink head driver (hereinafter referred to as a "driver"); 109-1 to 109-4, ink heads for discharging an ink; 110, a density judgment circuit for judging the density of a Yellow color; 111, an additional pattern generator; 112, a CPU for controlling the overall apparatus; 113, a ROM in which programs for operations of the CPU 112 are stored; 114, a RAM including a work area for various programs and a storage area for various parameters; 115, an AND gate; and 116, an OR gate.

Figure 4:
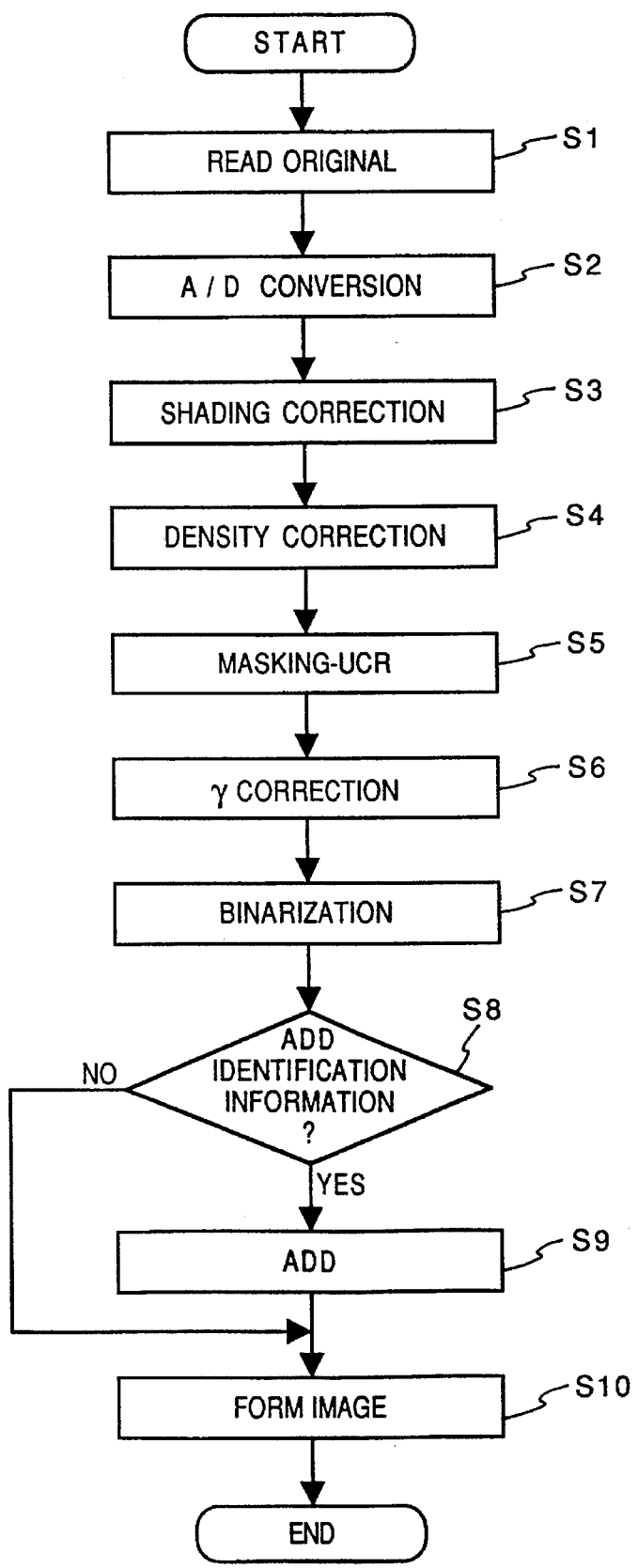
FIG. 4 is a flowchart explaining operations in the first embodiment.

The operations of the apparatus having the above construction will be briefly described below with reference to FIG. 4 which is a flowchart explaining the operations according to the first embodiment.

It should be noted that although the CPU 112 controls the overall apparatus, the respective circuits perform corresponding operations.

In step S1, the CCD line sensor 101 converts specular light obtained by radiating an original into a Red, Green and Blue (R, G and B) color-separated electric signals. The line sensor 101 moves relatively with respect to the original in a direction perpendicular to its scanning direction to obtain image signals for the entire original. In step S2, the A/D converter 102 converts the image signals from an analog amount to a digital amount, then in step S3, the shading corrector 103 corrects unevenness of light quantity and sensitivity of the line sensor 101 in the scanning direction.

In step S4, the density converter 104 converts the signals indicative of the intensity of light into a signals indicative of the density, thereafter, in step S5, the masking-UCR (Under Color Removal) circuit 105 converts the signals into image signals of cyan (C), magenta (M), yellow (Y) and black (K) colors of recording inks, and performs color correction and under color removal.

Next, the γ corrector 106 corrects the non-linear outputs as output characteristics of the signals in step S6, and the binarization circuit 107 binarizes the signals using pseudo half-tone processing in step S7. The binarized signals drive the ink heads 109-1 to 109-4 via the driver 108 to inject the C, M, Y and K inks on a recording sheet in accordance with the binary data and forms a color output image. The ink heads 109-1 to 109-4 are so-called bubble-jet type ink heads which boil an ink by heat energy to form bubbles and discharge the ink.

Regarding the Yellow (Y) signal, the density judgment circuit 110 inputs multi-level data before the binarization and judges whether it is within a predetermined density range in step S8. If YES, identification information unique to the apparatus is added to the Y signal by a judgment signal from the density judgment circuit 110 in step S9, and the image formation by the ink heads 109-1 to 109-4 driven by the driver 108 is performed based on the corrected image data in step S10.

If NO in step S9, the identification information is not added to the Y signal before the driver 108 drives the ink heads 109-1 to 109-4 to perform the image formation in step S10.

The identification information unique to the apparatus (additional information such as a name of apparatus model and a serial number) is stored in advance in the additional pattern generator 111. The additional pattern generator 111 encodes the identification information and sequentially outputs the coded data to generate an additional pattern.

Figure 2:
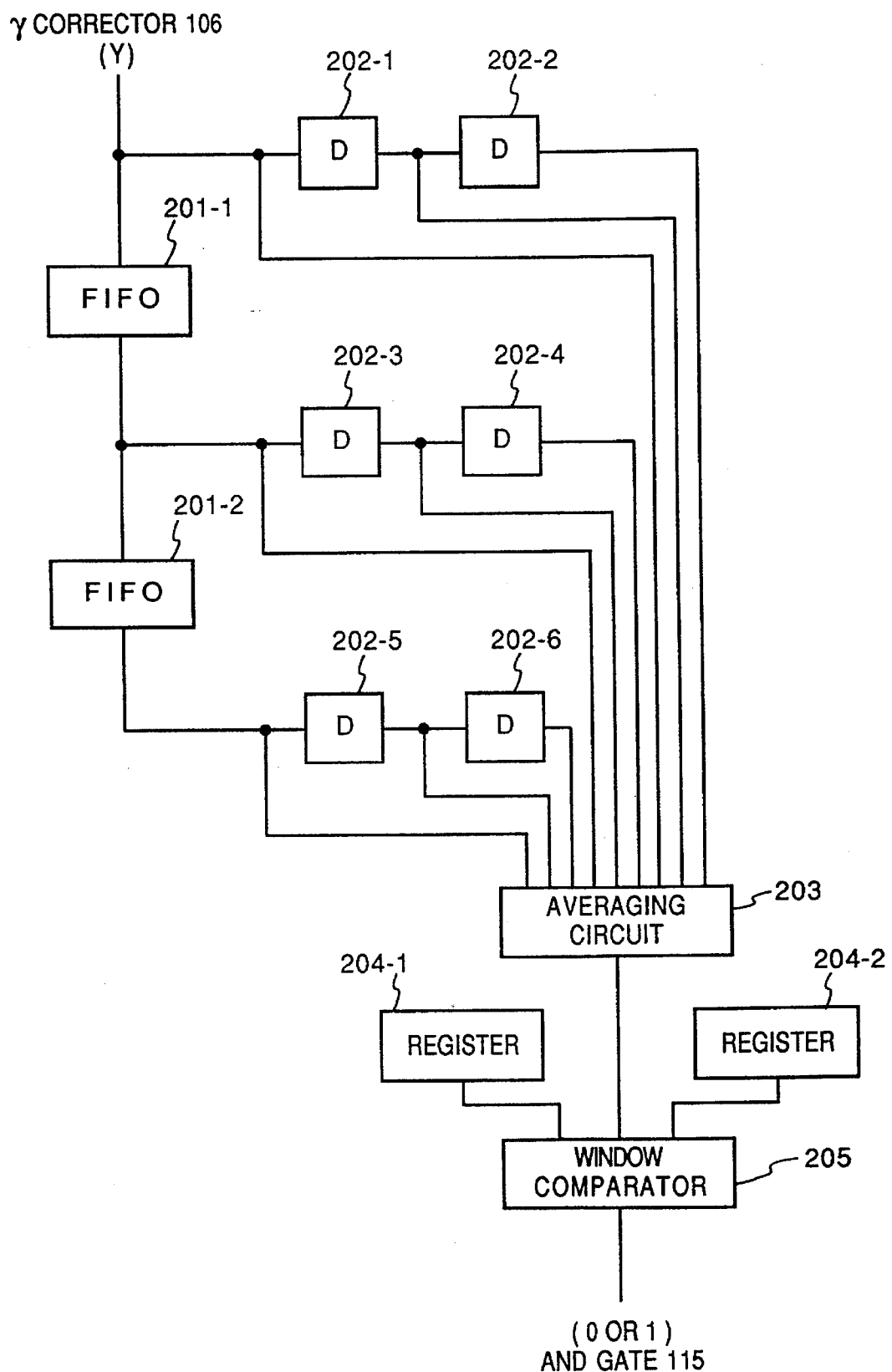
FIG. 2 is a block diagram showing a configuration of a density judgment circuit 110 according to the first embodiment.

FIG. 2 is a block diagram showing a configuration of the density judgment circuit 110. In FIG. 2, reference numerals 201-1 and 201-2 denote first-in-first-out memories (FIFO's); 202-1 to 202-6, D-flip-flops; 203, an averaging circuit; 204-1 and 204-2, registers; and 205, a window comparator.

The operations of the density judgment circuit 110 having the above construction will be briefly described below.

The FIFO's 201-1 and 201-2 delay the input yellow (Y) image signal for two lines. This operation enables processing of data for three lines. The D-flip-flops 202 delay the data for three lines by one clock to obtain an image signal of 3×3 pixel. The averaging circuit 203 averages this signal to diminish noise included in the image signal. Thereafter, the window comparator 205 judges whether the image data stands between the maximum value and the minimum value respectively set in the registers 204-1 and 204-2 and outputs a judgment result.

If the window comparator 205 judges that the image data is between the maximum value and the minimum value, it outputs a judgment result "1" (true) to the AND gate 115 so that the signal from the pattern generator 111 as a yellow (Y) image signal is added to the image data. On the other hand, if NO, the window comparator 205 outputs a judgment result "0" (false) to the AND gate 115 so that the signal from the pattern generator 111 is not added to the image data.

Figure 3:
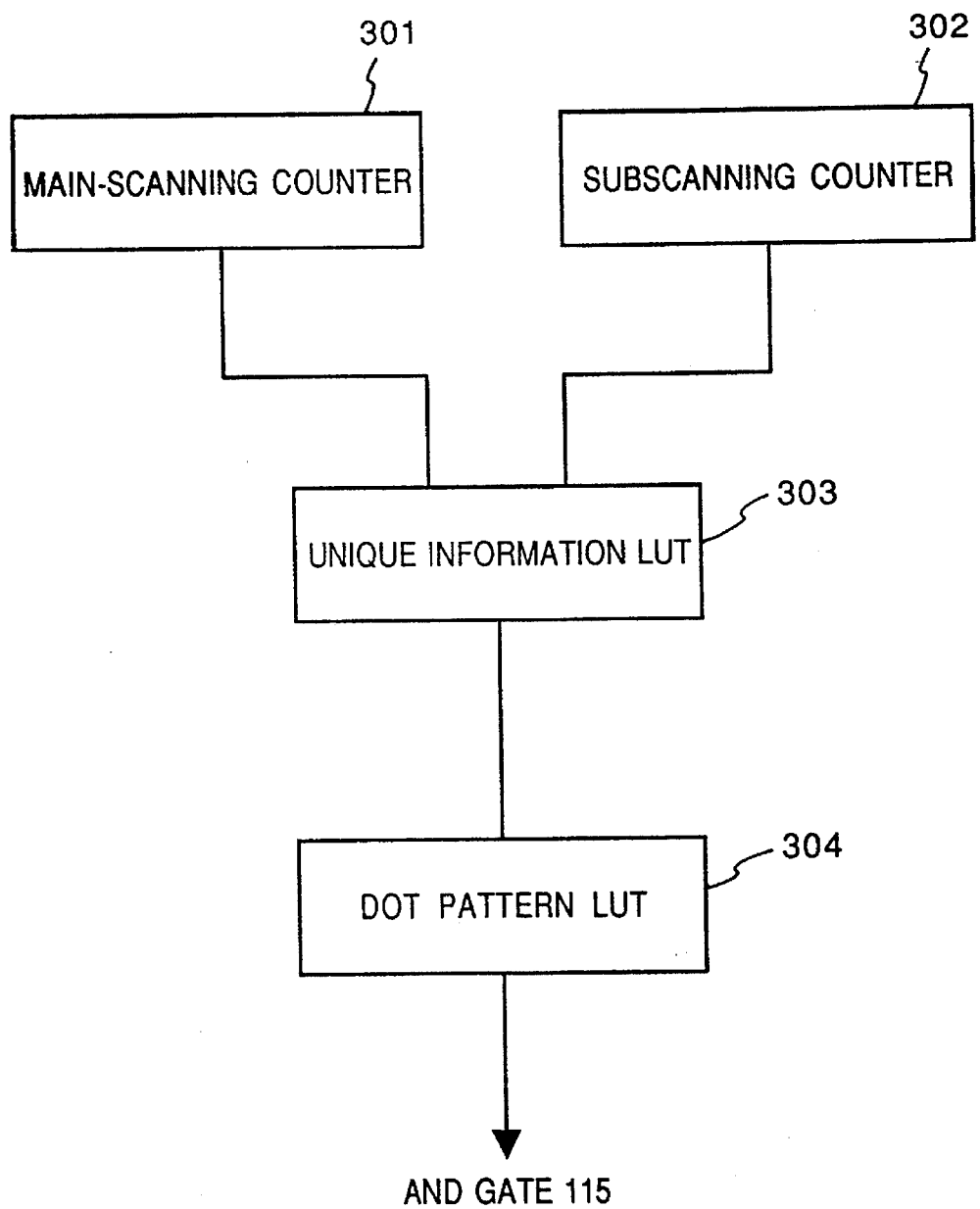
FIG. 3 is a block diagram showing a configuration of an additional pattern generator 111 according to the first embodiment.

FIG. 3 is a block diagram showing a configuration of the additional pattern generator 111. In FIG. 3, reference numeral 301 denotes a main-scanning counter; 302, a sub-scanning counter; 303, a look-up table in including unique information (hereinafter referred to as "unique information LUT"); and 304, a dot pattern look-up table (hereinafter referred to as "dot pattern LUT") for converting the unique information into a dot pattern.

The operations of the additional pattern generator 111 having the above construction will be briefly described below.

The main-scanning counter 301 and the subscanning counter 302 respectively perform a counting operation in accordance with clock signals in main-scanning and sub-scanning directions and refers to the unique information look-up table 303. The serial number of the apparatus as unique information is stored in the look-up table 303 and is repeatedly output in accordance with the count values. The dot pattern look-up table 304 is referred to based on the serial number to generate an image signal indicative of apparatus model information. If the determination by the density judgment circuit 110 is "1", the image signal indicative of apparatus model information is added to the initial image signal from the original before the output image is formed.

If the thus-formed output image, which the identification information using a predetermined dot pattern has been added with respect to the yellow (Y) image signal, is read by a reading means such as a reader and a scanner, only the yellow signal can be separated and the added information can be extracted out of the separated yellow signal.

In this embodiment, the identification information is added only if the density judgment circuit 110 judges that the image signal as the object of the addition of a dot pattern is within a predetermined density range. Accordingly, if an image adding portion is a very low density area where the additional information would be conspicuous, the pattern adding operation is not performed to the portion, to prevent degradation of image quality.

As described above, the arrangement judging whether the image density is within a predetermined range and adding a pattern indicative of the apparatus' unique information only if the density is within the predetermined range enables a pattern adding operation having a controlling influence over image quality.

The first embodiment is an example where the unique information is added to the yellow (Y) image signal based on the judgment that the image density is within a predetermined range, however, the present invention is not limited to this arrangement. For example, density judgment can be performed with respect to another color image signal and the identification information can be added to it, or the identification information can be added to plural color image signals.

Further, in this embodiment, density judgment is performed using an image signal before binarization, however, the density judgment based on a binarized signal is possible according to circumstances certain. That is, an average image density can be obtained by counting the number of dots within a unit area.

Second Embodiment

In the first embodiment, whether identification information is added is controlled based on the image density. However, it is possible to arrange not only changeover of adding/not adding identification information, but also selection of a dot pattern out of a plurality of patterns to be added. If a plurality of window comparators and registers in the density judgment circuit are provided, the density judgment can be performed at a plurality of levels. In this case, the dot patterns respectively have a different number of dots, and an appropriate pattern is selected in accordance with the density level. By this arrangement, a dot pattern closest to the image density can be selected and added, and the added pattern can be made less inconspicuous.

Third Embodiment

Figure 5:
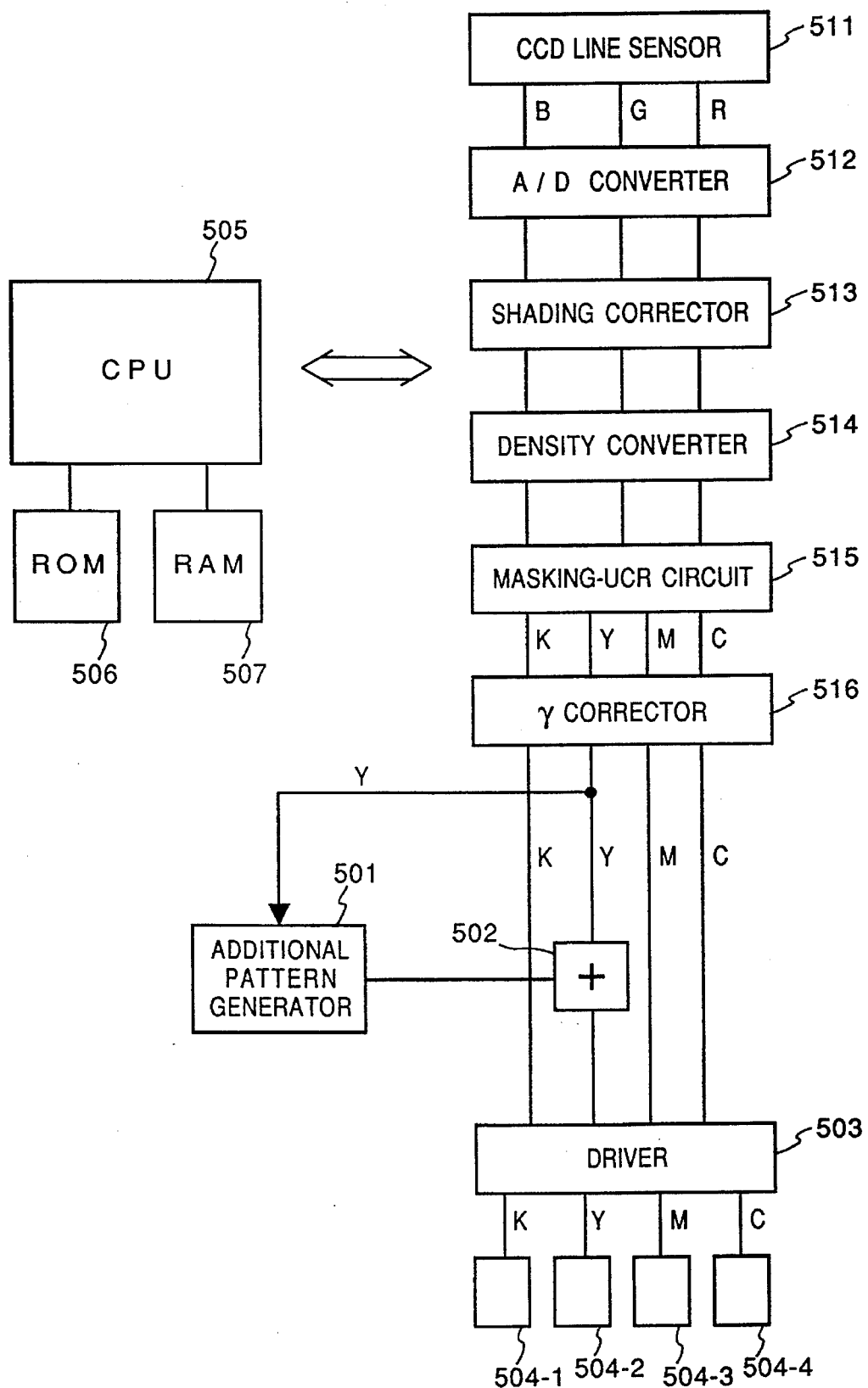
FIG. 5 is a block diagram showing a configuration of an image processing portion of a full-color copying apparatus according to a third embodiment.

FIG. 5 is a block diagram showing a configuration of an image processing portion of a full-color copying apparatus according to a third embodiment. In FIG. 5, elements corresponding to those in the first embodiment have similar constructions and therefore the explanations of the corresponding elements will be omitted.

As for elements having different constructions from those in the first embodiment, reference numeral 501 denotes an additional pattern generator; 502, an adder; 503, a driver; 504-1 to 504-4, laser diodes; 505, a CPU for controlling the overall apparatus; 506, a ROM in which programs for operations of the CPU 505 are stored; and 507, a RAM having a work area for various programs and a storage area for various parameters.

Figure 7:
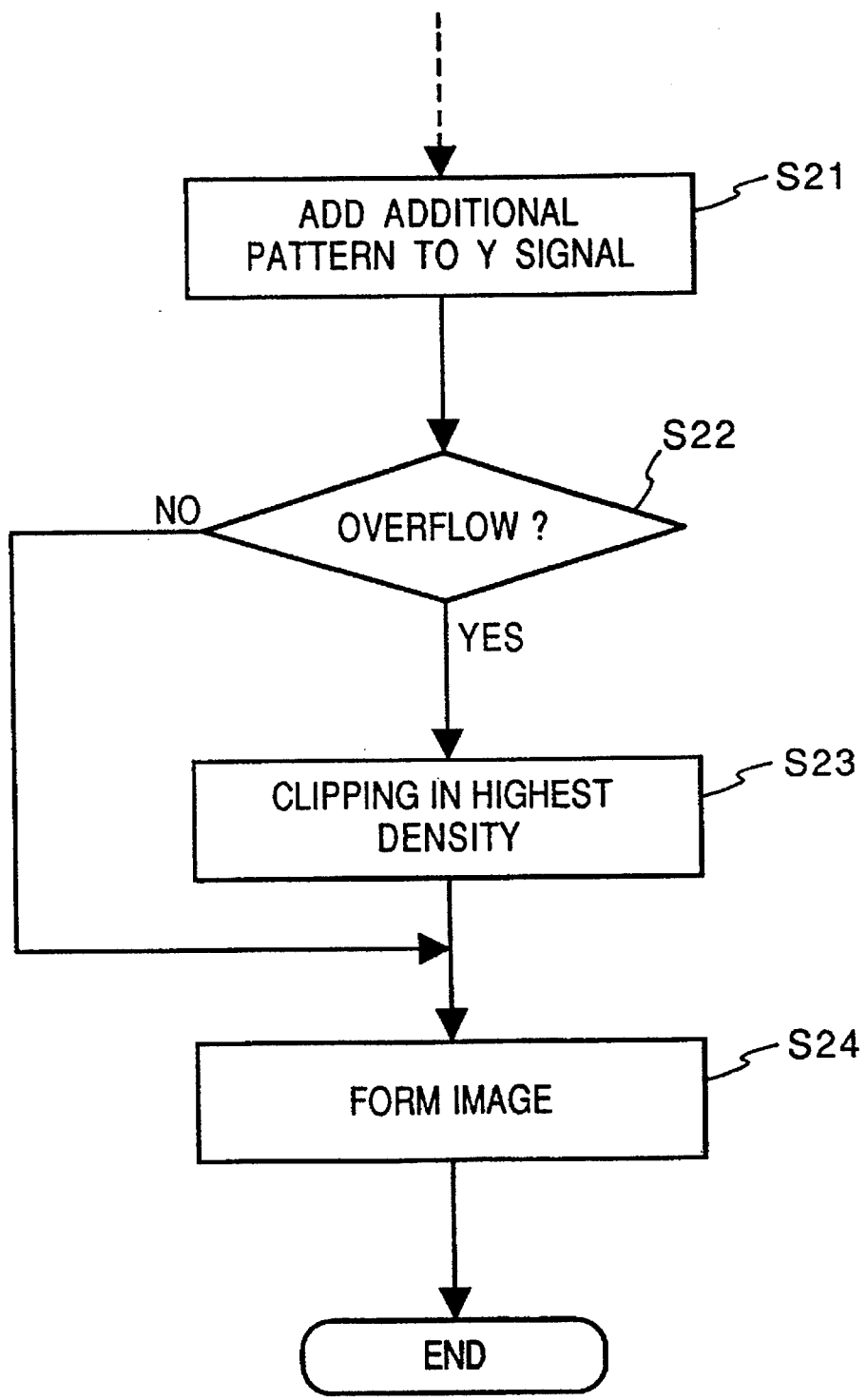
FIG. 7 is a flowchart explaining operations in the third embodiment.

The operations of the apparatus having the above construction will be described below with reference to FIG. 7 which is a flowchart explaining the operations according to the third embodiment.

It should be noted that though the CPU 505 controls the overall apparatus, the respective operations are performed by the circuits. Further, the operations performed by a CCD line sensor 511 to a γ corrector 516 correspond to those in the flowchart of FIG. 4, therefore the explanations there for will be omitted, and mainly the subsequent operations will be described.

When the additional pattern generator 501 generates one of additional patterns having gradations of 256 levels, it selects a gradation of one level in accordance with a yellow (Y) image signal which has been γ-corrected by the γ-corrector 516. In step S21, the adder 502 adds the additional pattern generated by the additional pattern generator 501 to the γ-corrected yellow (Y) image signal. Further, the adder 502 judges whether the addition result overflows a predetermined value in step S22. In case of overflow, a clipping operation is performed in the highest density in step S23. The driver 503 converts the yellow (Y) and other image signals to which the additional pattern has been added by the adder 502 into a signal for driving the laser diodes 504-1 to 504-4. Laser lights emitted from the laser diodes 504-1 to 504-4 form C, M, Y and K latent images on an electrostatic drum (not shown). A full-color image is formed by developing the latent images by a toner in step S24.

Figure 6:
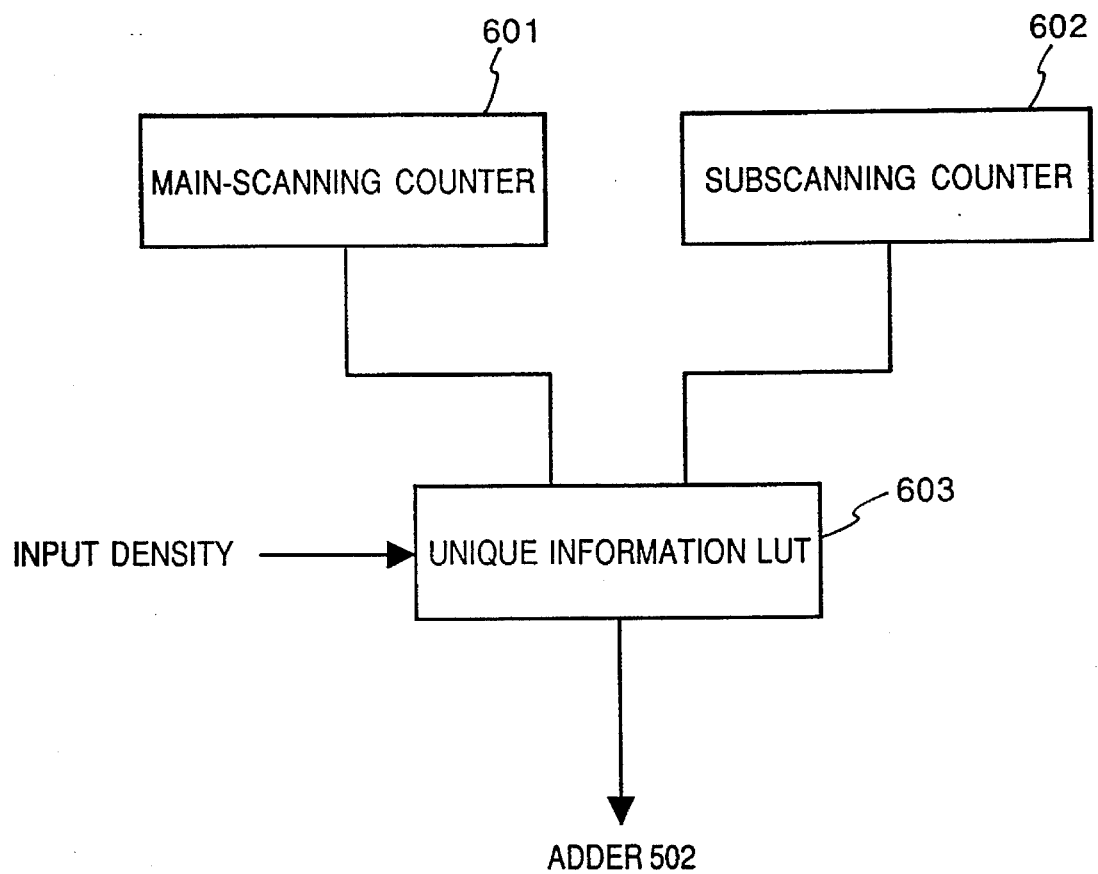
FIG. 6 is a block diagram showing a configuration of an additional pattern generator 501 according to the third embodiment.

FIG. 6 is a block diagram showing the configuration of the additional pattern generator 501 according to the third embodiment. In FIG. 6, reference numeral 601 denotes a main-scanning counter; 602, a subscanning counter; 603, unique information LUT including information unique to the apparatus. The main-scanning counter 601 and the subscanning counter 602 respectively perform counting operations in accordance with clock signals in main-scanning and subscanning directions included in the image signal and they refer to the unique information LUT 603 in accordance with a position on the image. The unique information LUT 603 includes a serial number of the apparatus and it repeatedly outputs the serial number in accordance with the count values. The yellow (Y) image signal i.e. a density signal is input into the unique information LUT 603. In accordance with the value of the input density signal, an address bank is selected so that a different additional pattern can be generated. Usually, within the eight-bit input density signal, not all of the eight bits, but the higher four bits are employed for selecting sixteen banks. Note that the number of banks can be changed in case of need. Further, a converter for selecting banks based on density can be added for a more flexible changeover of density level. In a higher-density portion, an additional pattern can be made inconspicuous. For this reason, in the unique information LUT 603, additional patterns for higher-density portions correspond to large density values, while additional patterns for lower density portions correspond to small density values. In this arrangement, the unique information LUT 603 serves as a density judgment circuit.

As described above, in case of electrophotographic outputting, different from the ink-jet method in the first embodiment, density gradation of one pixel can be changed. This embodiment enables pattern addition at an appropriate density level for every density image, making the pattern detectable but not recognizable with the naked eye.

In the first embodiment, the density judgment circuit 110 judges whether to add a pattern or not if the density of an image is between predetermined maximum and minimum values, however, the present invention is not limited to this arrangement. For example, it can be arranged that the additional pattern generator 501 generates plural kinds of additional patterns and a judgment result by the density judgment circuit 110 is expressed by multi-level data as an additional pattern selection signal. In this case, in place of the AND gate 115, a selector can be arranged for selecting an additional pattern in accordance with the multi-level value and corresponding to a density position between the maximum and minimum values.

In addition, it can be arranged so that the maximum and minimum values are manually set in a "service mode" (a mode in which a maintenance engineer can access the apparatus).

As described above, according to the present invention, the density of an image is determined and only if it is within a predetermined density range, a pattern indicative of information unique to the apparatus is added to the image. Thus pattern addition preventing influence upon image quality can be realized.

Fourth Embodiment

Figure 8:
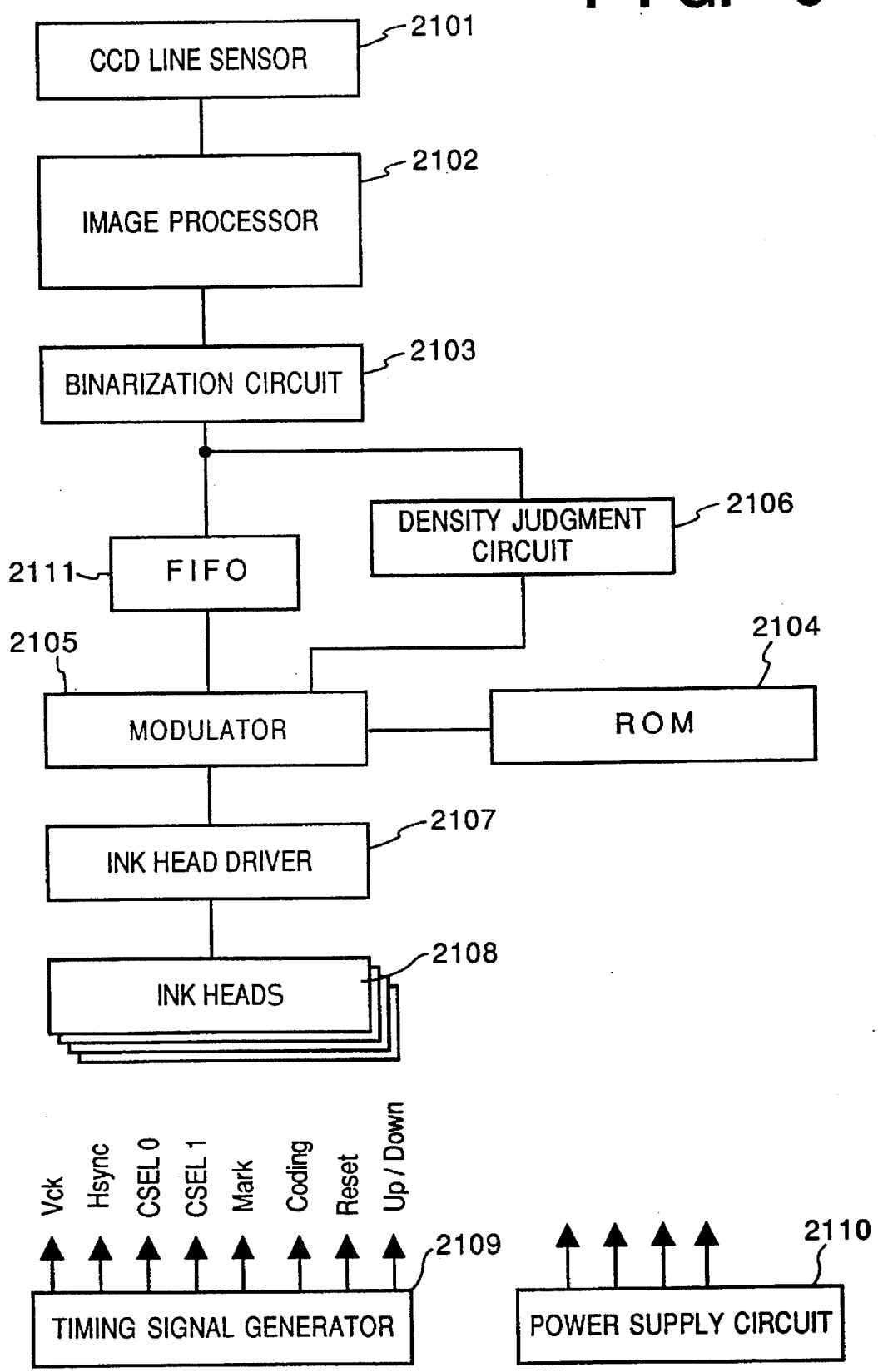
FIG. 8 is a block diagram showing a configuration of an image processing portion of a full-color copying apparatus according to a fourth embodiment.

FIG. 8 is a block diagram showing a configuration of an image processing portion of a full-color copying apparatus according to a fourth embodiment of the present invention. In FIG. 8, reference numeral 2101 denotes a CCD line sensor; 2102, an image processor; 2103, a binarization circuit; 2104, a ROM; 2105, a modulator; 2106, a density judgment circuit; 2107, an ink head driver; 2108, ink heads; 2109, a timing signal generator; 2110, a power supply circuit; and 2111, a FIFO.

The CCD line sensor 2101 captures specular light from an original or light color-separated from light penetrated through the original moving in a direction vertical to its scanning direction relative to the original and converts the light into electric signals. The image processor 2102 processes the full-color signals and the binarization circuit 2103 binarizes the signals by a pseudo half-tone processing. the density judgment circuit 2106 judges the density of image signal to control the operation of the modulator 2105 which adds additional information. The modulator 2105 changes dot positions of the binary image signal based on the contents of the ROM 2104 and adds additional information to the image signal.

The FIFO memory 2111 is employed for compensating for delay of image signals caused by the density judgment circuit 2106. The binary signal, including the additional information added by the modulator, 2105 controls the ink head driver 2107 to drive the ink heads 2108 for respective output colors, which discharge inks on a recording sheet (not shown) and forms a full-color image. The timing signal generator 2109 generates an image clock as a base signal and accompanying various clock signals and timing signals, and sends them to the respective elements. Note that the power supply circuit 2110 supplies the elements with necessary electric power.

Figure 9:
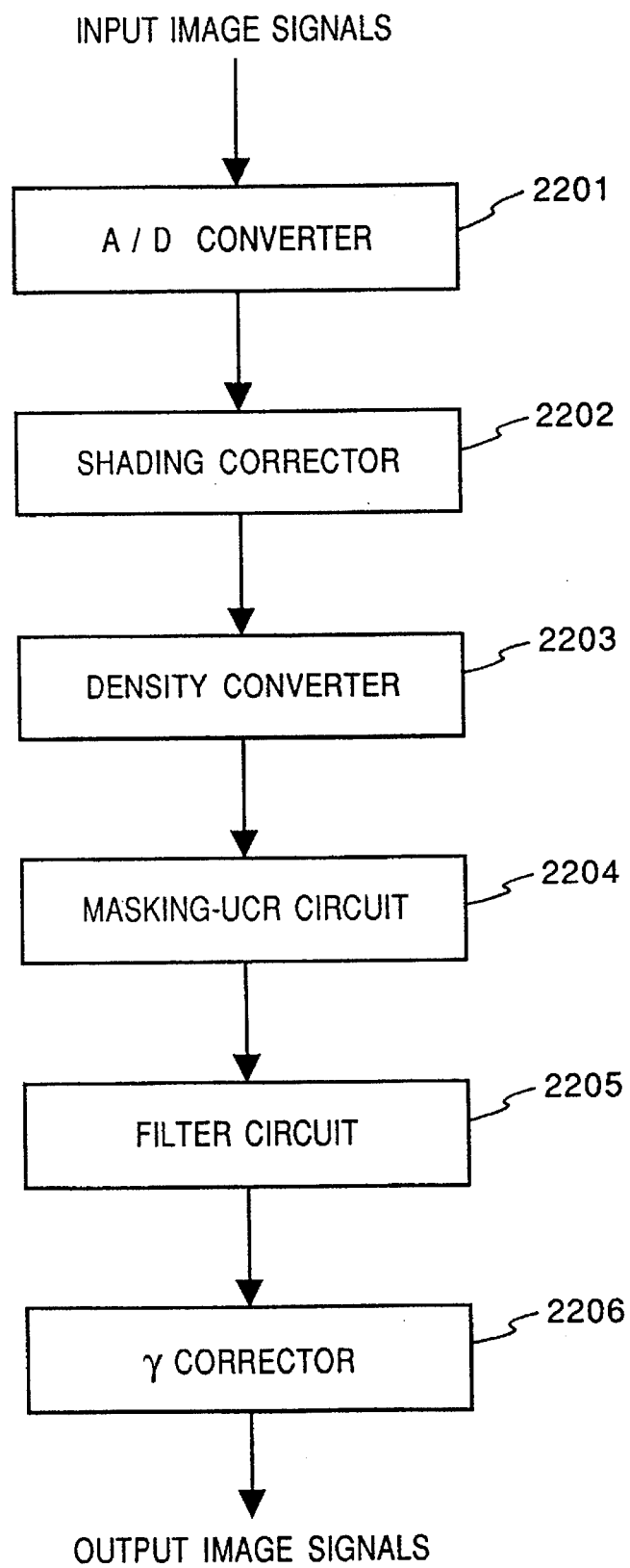
FIG. 9 is a block diagram showing a construction of the image processor 2102 of FIG. 8 according to the fourth embodiment.

FIG. 9 is a block diagram showing the construction of the image processor 2102. In FIG. 9, reference numeral 2201 denotes an A/D converter; 2202, a shading corrector; 2203, a density converter; 2204, a masking-UCR circuit; 2205, a filter circuit; and 2206, a γ corrector. The A/D converter 2201 converts color-separated image signals of red, green and blue (R, G and B) input from the CCD line sensor 2101 into digital signals. The shading corrector 2202 corrects light quantity distribution or unevenness of the signals due to non-uniformed sensitivity of the CCD line sensor. Thereafter, the density converter 2203 converts the RGB signals indicative of brightness into cyan, magenta and yellow (C, M, and Y) density signals.

The masking-UCR circuit 2204 generates a black (K) signal from the CMY signals and performs masking calculation and under color removal (UCR) for color correction. The filter circuit 2205 performs edge emphasis operation or smoothing operation to the CMYK signals and corrects the non-linear outputs from the γ corrector 2206.

Figure 10:
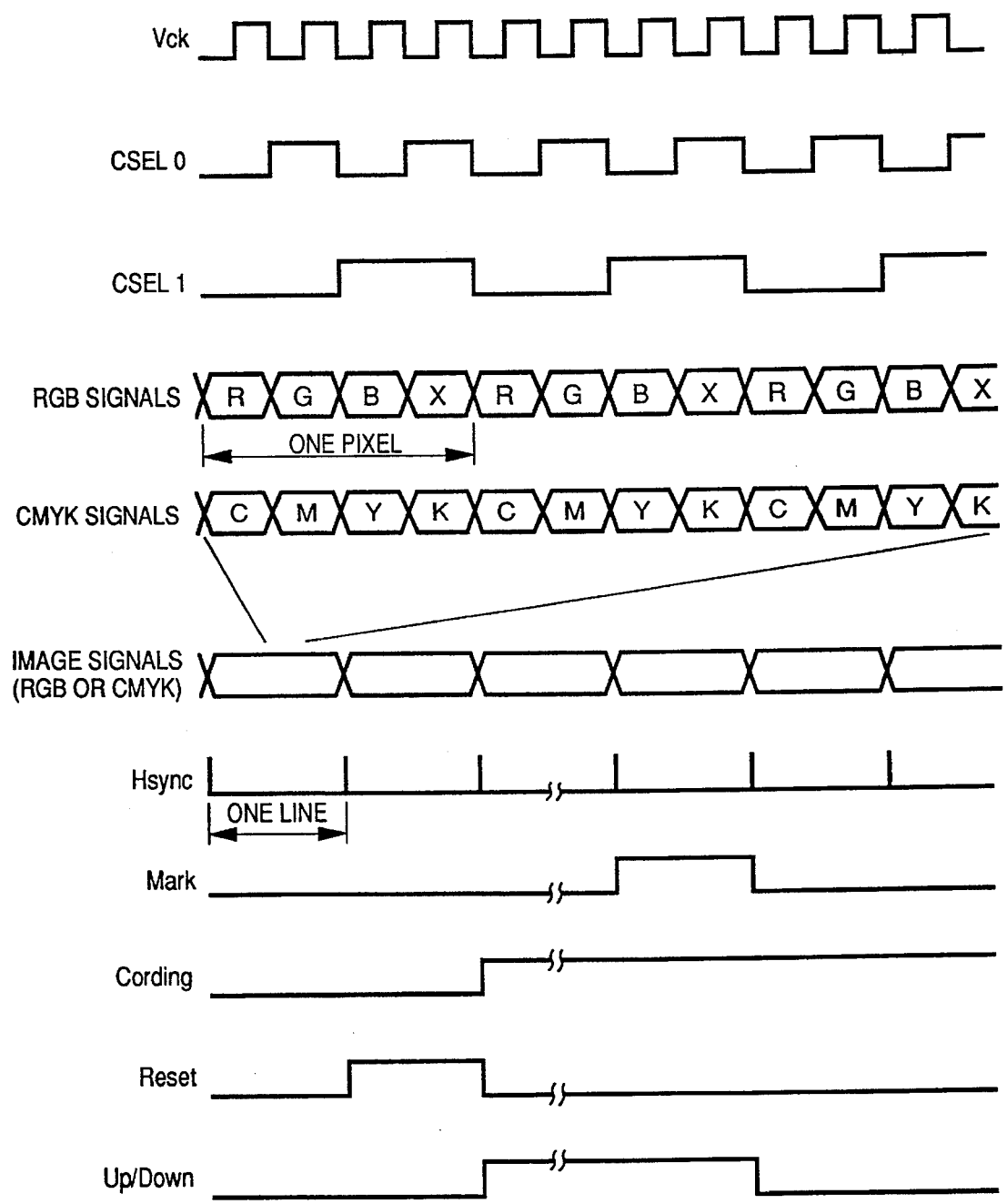
FIG. 10 is a timing chart of an image signal according to the fourth embodiment.

The above-processed signals and signals out of the processing are continuities of RGB or CMYK signals as shown in FIG. 10. The RGB signals includes a non-image signal section "X" and the signals for four clocks compose a color-separated signal for one pixel. The RGB signals are changed over synchronizing with color select signals CSEL 1 and 0. An image clock Vck defines a reference period of these signals, and a synchronous signal Hsync defines a repetitive period by line. Further, a Mark signal is supplied in a line where a marking line indicative of an additional information adding position is inserted, and a Coding signal is supplied in a line where the image signal is modulated. Both signals are employed for identifying the corresponding lines.

The timing signal generator 2109 also generates a Reset signal and an Up/Down signal necessary for generating additional information. The Coding, Mark, Reset and Up/Down signals are repeatedly generated in the subscanning direction at a constant period, and adding of information to an image signal is performed repeatedly in accordance with the generation of these signals.

An initial value of the timing signal generator 2109 is not reset to the same value at every copying operation so that the information adding position in an image is not fixed. The timing signal generator 2109 generates a series of timing signals in this manner and the overall apparatus operates in synchronism with the image signal.

Figure 21:
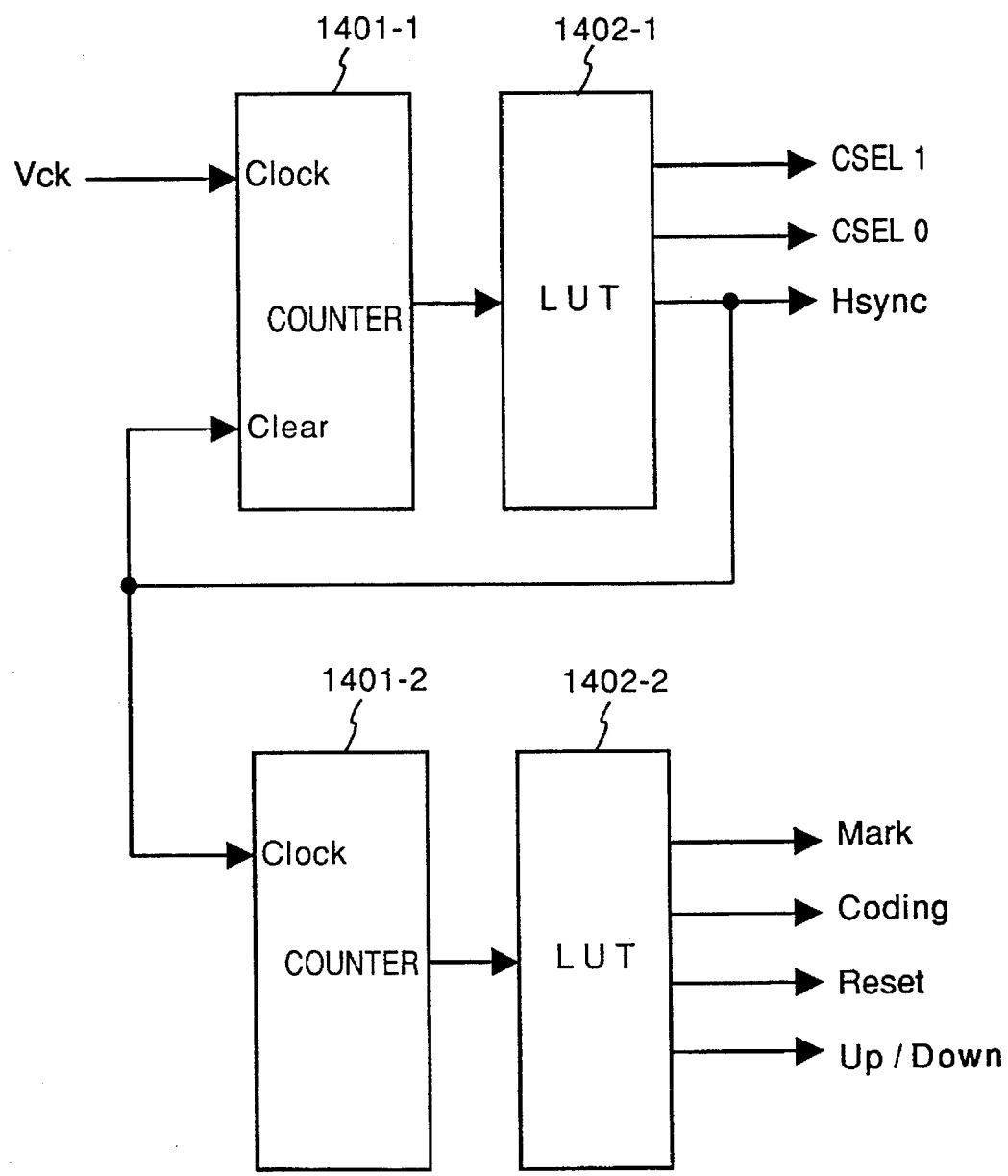
FIG. 21 is a block diagram showing a configuration of a timing signal generator 2109 of FIG. 17 according to the fifth embodiment.

FIG. 21 is a block diagram showing the configuration of the timing signal generator 2109. In FIG. 21, reference numeral 1401-1 and 1401-2 denote counters; and 1402-1 and 1402-2, look-up tables. The counter 1401-1 is employed for generating timing signals in the main-scanning direction. The counter 1401-1 counts the Vck after it is reset by the Hsync. The look-up table 1402-1 is referred to based on the output from the counter 1401-1.

The look-up table 1402-1 is a ROM or RAM in which patterns of the CSEL 0, CSEL 1 and Hsync to be generated are stored from the first line, and the signals are generated sequentially with reference to the output from the counter 1401-1.

On the other hand, the counter 1401-2 and the look-up table 1402-2 are employed for generating timing signals in the subscanning direction. The counter 1402-2 counts the Hsync to perform similar operations to those in the main-scanning direction. Different from the timing signal generating operation in the main-scanning direction, the counter 1401-2 is not reset to a predetermined value at every copying operation, avoiding fixing the information adding position in the subscanning direction.

Further, it can be arranged so that the initial value of the counter 1401-2 is set at every copying operation, depending upon where the information adding position is to be located.

In this manner, identification information is added repeatedly and the adding position is changed at every copying operation, accordingly, even in the case of poor operation of a specific ink head or existence of an area in a density inapplicable for adding information, possibility of reproducing the added information from any of output images can be increased. Especially, setting the number of nozzle heads and the repeating period so that they have no common measure is effective for reproduction of added information.

Figure 11:
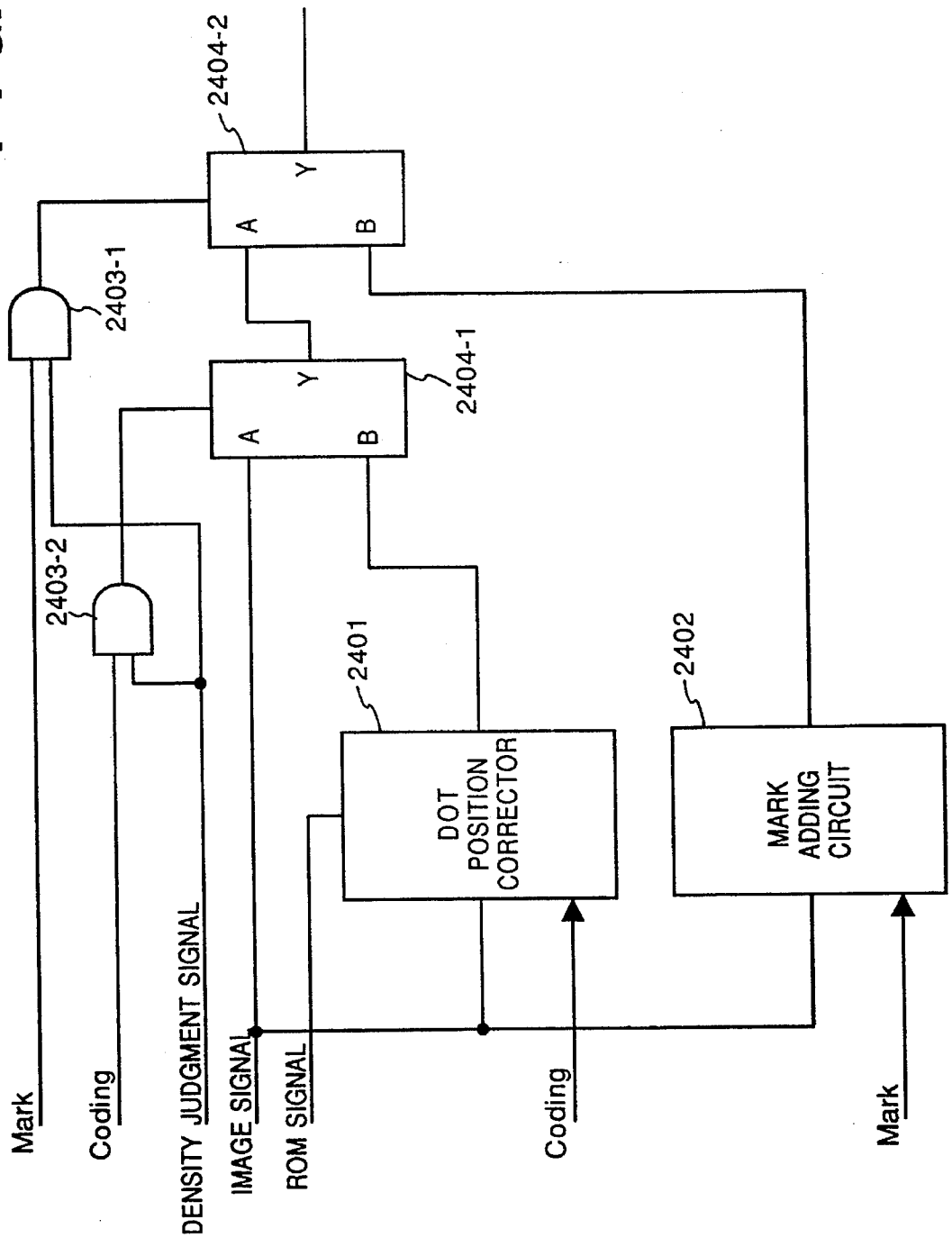
FIG. 11 is a block diagram showing a construction of the modulator 2105 of FIG. 8 according to the fourth embodiment.

FIG. 11 shows the construction of the modulator 2105. In FIG. 11, reference numeral 2401 denotes a dot position corrector; 2402, a mark adding circuit; 2403-1 and 2403-2, AND gates; and 2404-1 and 2404-2; selectors. The input image signal enters the mark adding circuit 2402 and the dot position corrector 2401 which corrects dot positions of the image signal. The selector 2404-1 selects either the input image signal or the corrected image signal from the dot position corrector 2401 in accordance with the AND of a density judgment signal and a coding signal. On the other hand, the selector 2404-2 selects either the output from the selector 2402-1 or the output from the mark adding circuit 2402 in accordance with the AND of the density judgment signal and a Mark signal. If the density judgment signal is a logical value "0" meaning that the density is not appropriate, the selectors 2404-1 and 2404-2 respectively select signal of side "A" in FIG. 11, as a result, the input image signals are output without correction.

Figure 12:
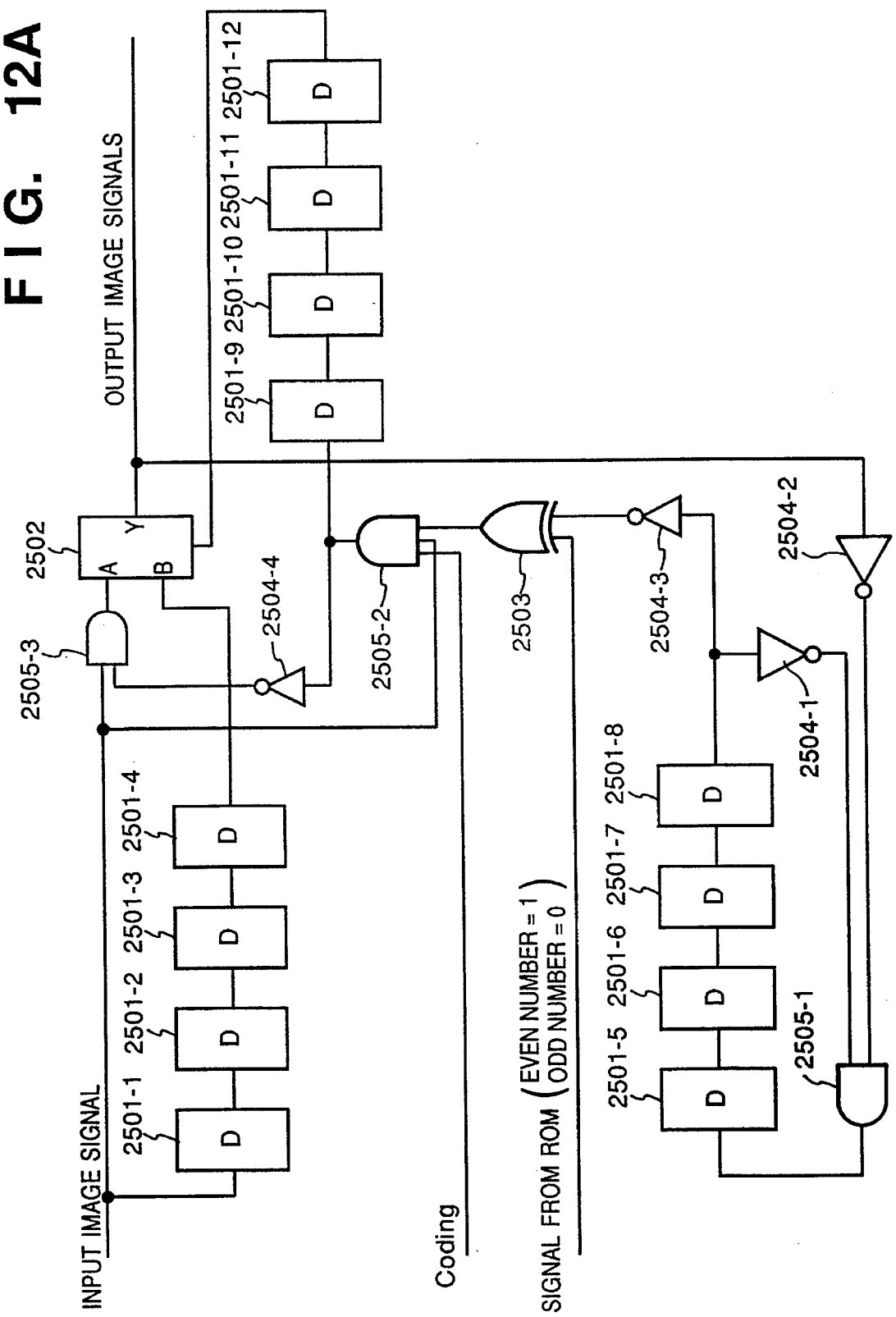
FIG. 12A is a block diagram showing in detail a construction of a dot position corrector 2401 of FIG. 11 according to the fourth embodiment.
FIG. 12B is a diagram showing as an example processing of generating a line having odd number intervals.

FIG. 12A is a block diagram showing the configuration of the dot position corrector 2401. In FIG. 12, reference numerals 2501-1 to 2501-12 denote D-flip-flops; 2502, a selector; 2503, an exclusive-OR (XOR) gate; 2504-1 to 2504-3, inverters; and 2505-1 to 2505-3, AND gates. Note that the image clock Vck (not shown) is applied to the D-flip-flops 2501-1 to 2501-12. The image signal and the image signal delayed by the D-flip-flops 2501-1 to 2501-4 enter the selector 2502.

As described above, in the image processing portion according to this embodiment, the image signals represent one-pixel information by the RGBX/CMYK four clock period. Accordingly, the delayed image signals which enter the selector 2502 include e.g. the C signal delayed for one pixel. The selector 2502 selects either one of the non-delayed image signals (side "A") or the delayed image signals (side "B"), thus shifting the printing position of the dot to be output by one dot.

If the Coding signal is not added, the output from the AND gate 2505-2 becomes a logical value "0" and the dot position correction is not performed. If the Coding signal is added, whether the dot position correction is performed or not is decided in accordance with the AND of the output from the XOR gate 2503 and the image signals (the AND 2505-2). If the 1/0 bit (an odd number interval =1, an even number interval=0) read out of the ROM does not coincide with the output from the D-flip-flops 2501-8 inverted by the inverter 2504-3, the dot position correction is performed. Note that the D-flip-flops 2501-5 to 2501-8 and the inverter 2504-1 comprise a one-bit counter and count by four clocks. The D-flip-flop 2501-8 outputs a counting status in synchronism with the color of input image signals.

If the output from the selector 2502 becomes a logical value "1" with respect to one color, the output from the AND gate 2505-1 becomes a logical value "0" to reset the value, and what the Vck/4 (corresponds to a number of pixels) at that time represents, i.e., the odd/even number interval, is maintained as the content of the counter. The XOR gate 2503 compares the above information with the additional information from the ROM, and if they do not coincide, the dot position correction is performed.

In this manner, the odd/even number dot interval in the image signal to be output can be controlled in accordance with the 1/0 of the additional information from the ROM. Note that the additional information output from the ROM changes by one line, and the dot interval of the modulated image signals is changed to the odd/even number interval by one line. FIG. 12B shows as an example line generating for a line of even number interval.

Figure 13:
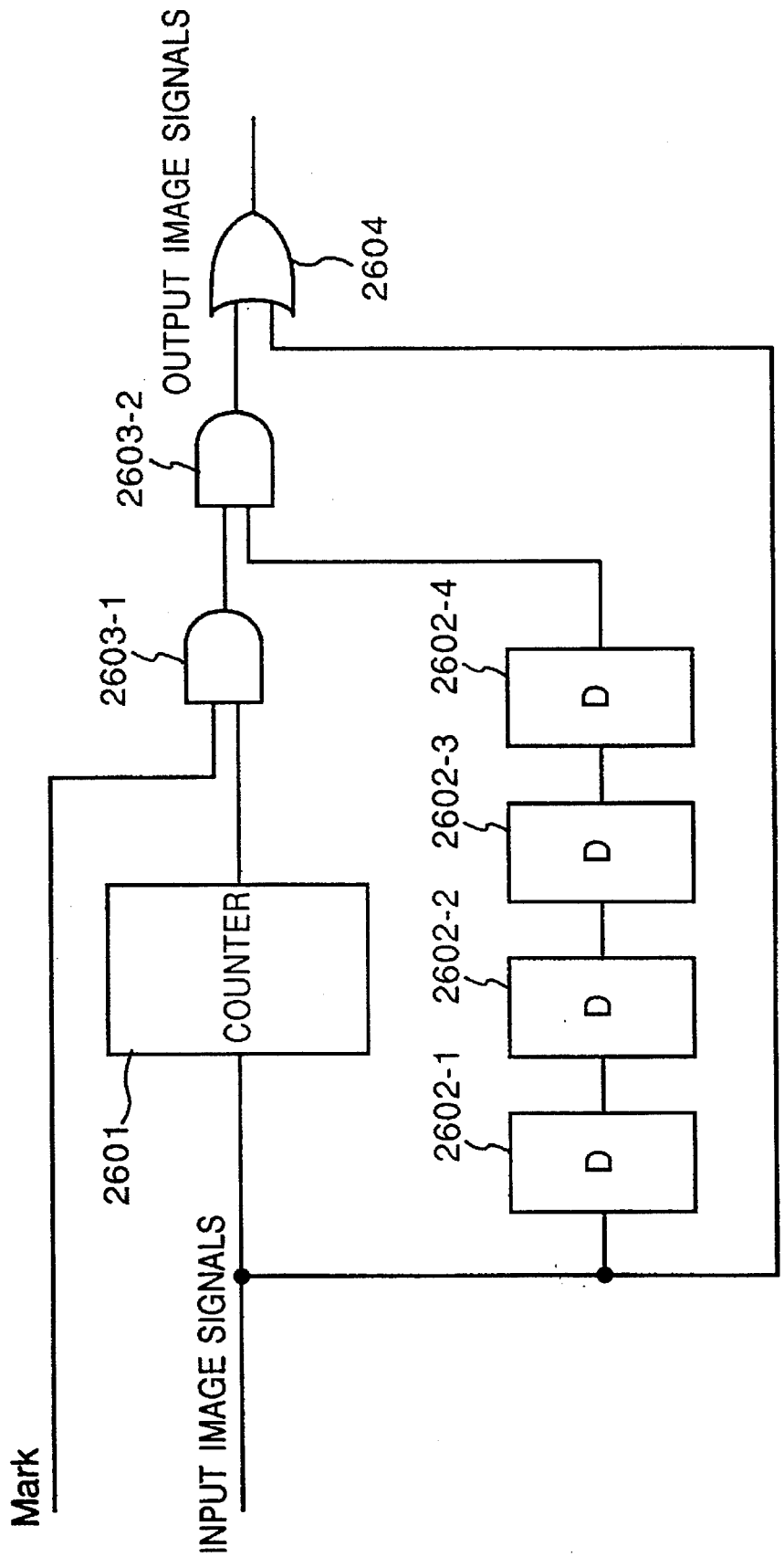
FIG. 13 is a block diagram showing in detail a construction of the mark adding circuit 2402 of FIG. 11 according to the fourth embodiment.

FIG. 13 is a block diagram showing the construction of the mark adding circuit 2402. In FIG. 13, reference numeral

2601 denotes a counter; 2602-1 to 2602-4, D-flip-flops; 2603-1 and 2603-2, AND gates; and 2604, an OR gate. The image clock Vck (not shown) is applied to the D-flip-flops 2602-1 to 2602-4.

If the Mark signal is not applied, the output of the AND gate 2603-1 always becomes a logical value "0", and the image signals are not corrected. If the Mark signal is applied, the image signal correction is performed in the following manner.

The counter 2601 is a two-bit counter which counts a number of dots with respect to each color of the image signals in accordance with a color selection signal. The counter 2601 generates a carry at every fourth dot printing in each color and transmits a carry of a corresponding color to the output side. The AND gate 2603-2 ANDs the carry signal and the four clocks i.e. image signals delayed by one pixel, then the OR gate 2604 adds the AND to the initial image signals. As a result, two dots are continuously output at every fourth dots in each color.

Figure 14A:
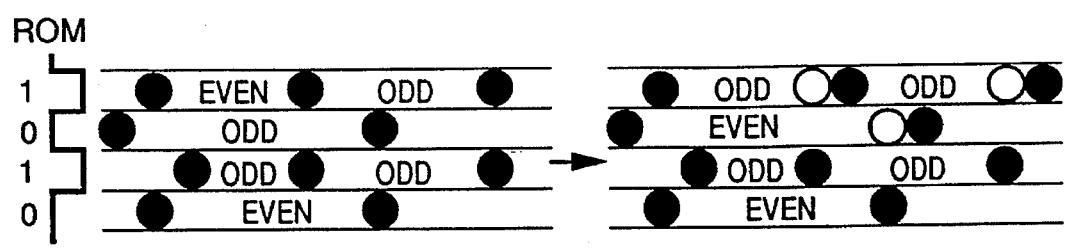
FIGS. 14A and 14B are diagrams explaining changes in the image signal by operation of the modulator 2105 of FIG. 8 according to the fourth embodiment.
Figure 14B:
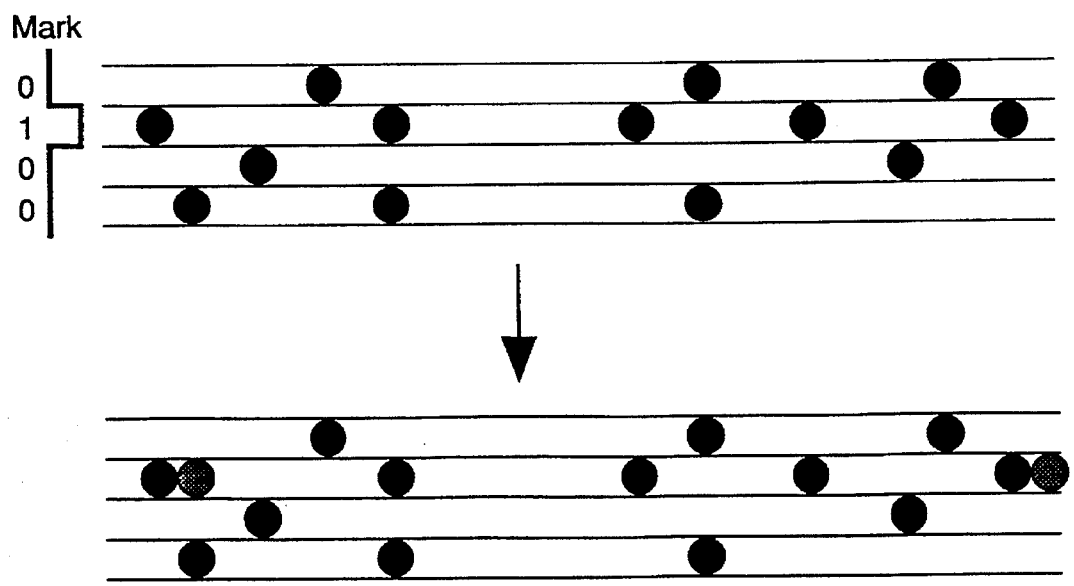

FIGS. 14A and 14B illustrate changes in the image signal of one color in modulation by the modulator 2105. In FIGS. 14A and 14B, black dots represent pixels to be printed on a recording sheet by discharging ink.

FIG. 14A shows dot position correction, where the dot intervals after the correction have dots of a uniform odd/even number in one line. In the first line, the second and third dots are shifted by one dot in a lateral direction, so that the numbers of dot intervals are coincident with the output data from the ROM.

The first line of the FIG. 14A shows an even number of dot positions between the 1st and 2nd dots and an odd number of dot positions between the 2nd and 3rd dots. Since the ROM output is equal to "1", the dot intervals between any two dots is to be made odd. Thus, the second dot is shifted by one dot interval and the 3rd is also shifted by one dot interval. Note that the 2nd dot is shifted to the right and the 3rd dot shifted to the right. As a result, the interval between each dot is now made up of odd dot positions. In the case of the second line, the ROM output indicates that there should be an even number of dot positions between dots. Since the original has an odd number of dot positions, the 2nd dot is shifted by one dot position, thus making the number of dot positions even. The third and fourth lines already conforms to the requirements of the output of ROM, therefore no changes are required.

FIG. 14B shows mark addition. In a line to which the Mark signal is added (mark line), two continuous dots appear at every fourth dot. In this manner, the serial number of the apparatus and the mark can be added by modulating the image signal.

As it is well known, in a binary signal binarized with Error Diffusion method, dots are appropriately distributed especially in a lower density area which corresponds to a high-lighted portion, and it is rare that two continuous dots appear in this area. Consequently, a line having two continuous dots in a predetermined number of dots can be easily found by magnifying the output image.

Figure 15:
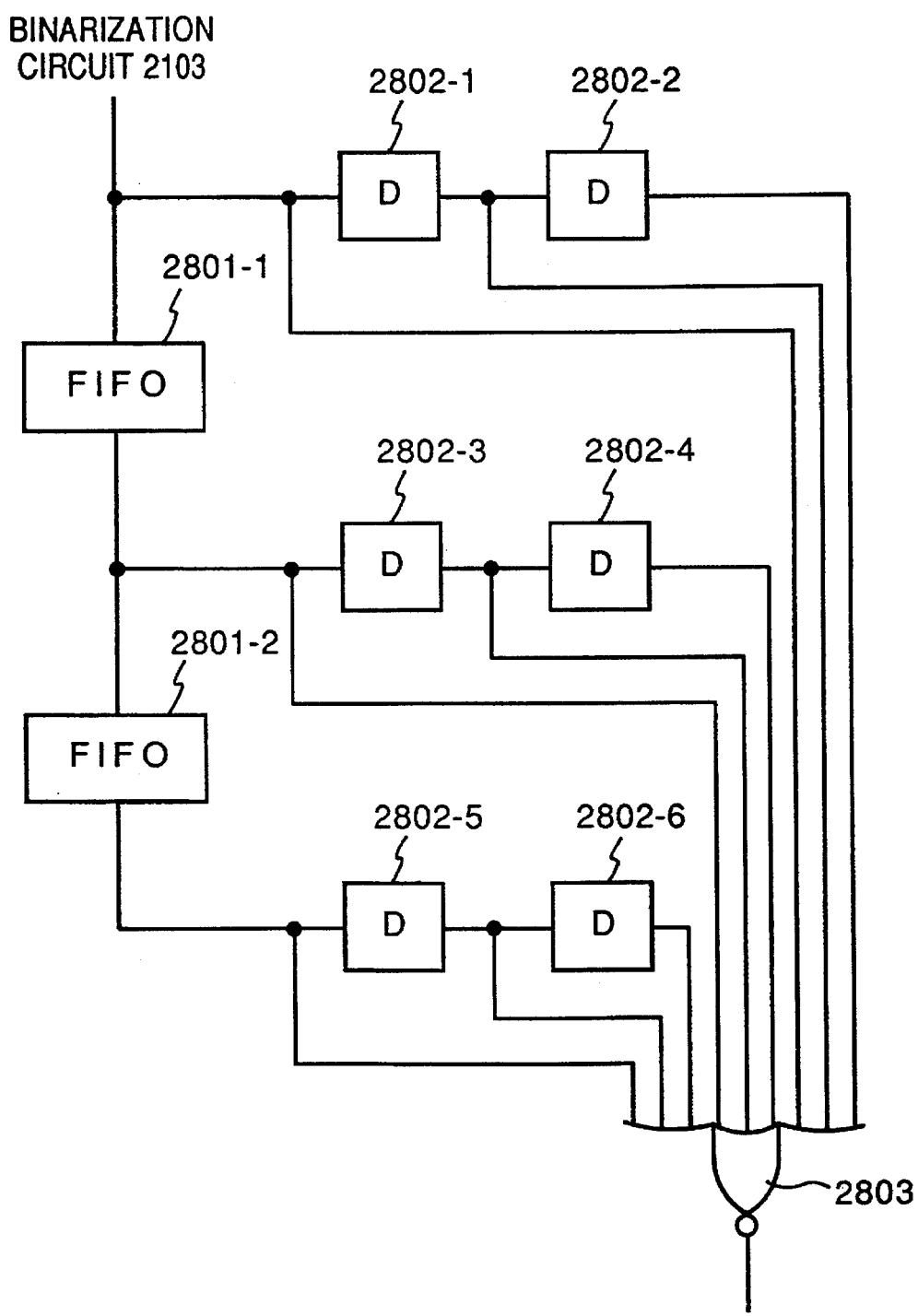
FIG. 15 is a block diagram showing a configuration of an density judgment circuit 2106 of FIG. 8 according to the fourth embodiment.

FIG. 15 is a block diagram showing the configuration of the density judgment circuit 2106. In FIG. 15, reference numerals 2801-1 and 2801-2 denote FIFO's; 2802-1 to 2802-6, D-flip-flops; and 2803, a NOR gate. When the signals binarized by the binarization circuit 2103 enter the density judgment circuit 2106, the FIFO's 2801-1 and 2801-2 each delay the signals by one line, thus enabling processing for three line data.

The D-flip-flops 2802 delays the signals from the binarization circuit 2103 by one clock to obtain 3×3 pixel image signals. The image signals enter the NOR gate 2803 which judges whether any dots exist in 3×3 pixel area around an object pixel. If some dots exist in this area, the output from the NOR gate becomes a logical value "0", in this case, the image signals are output without modulation by the modulator 2105.

By this arrangement, a higher-density area is not modulated, which prevents degradation of image quality due to modulation.

Figure 16:
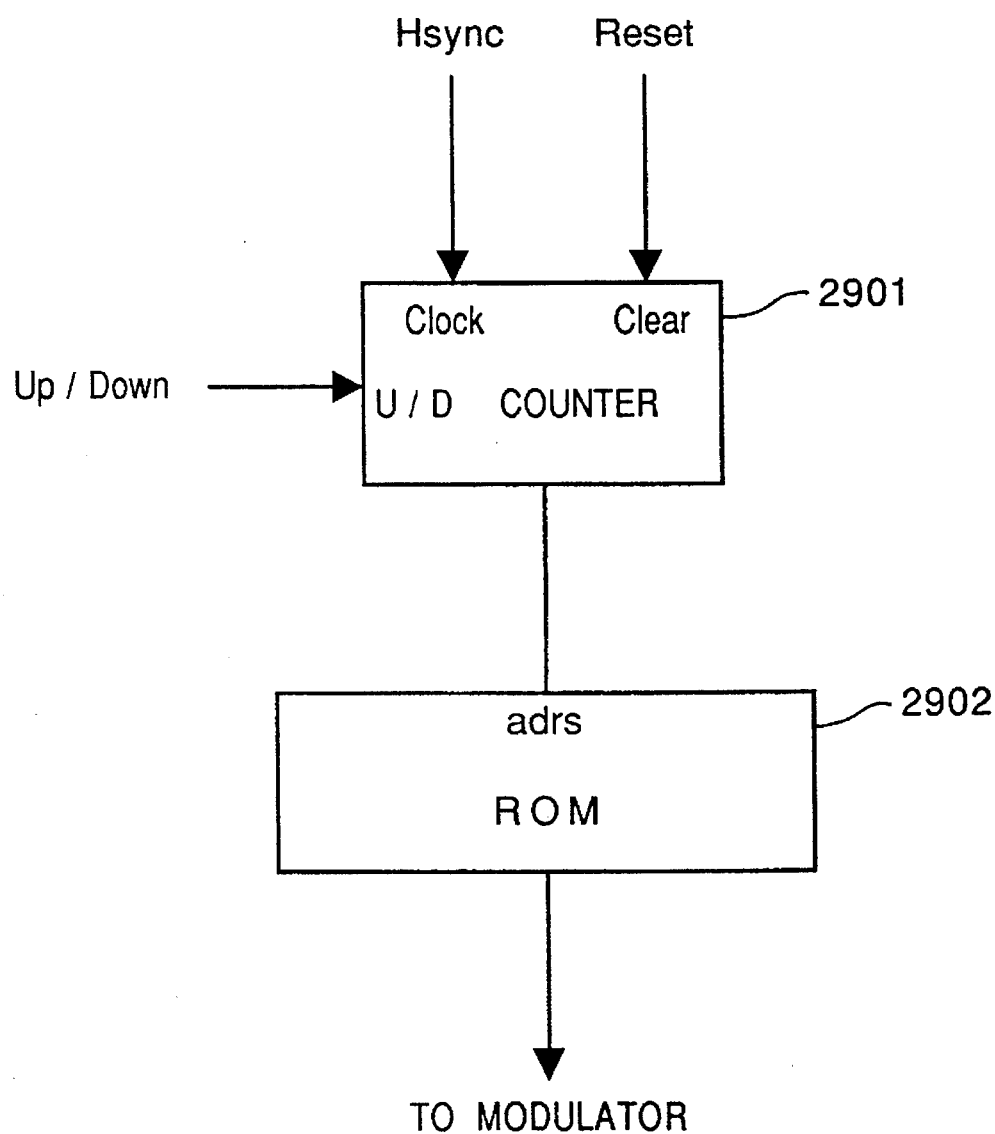
FIG. 16 is a diagram showing a construction of a ROM 2104 of FIG. 8 according to the fourth embodiment.

FIG. 16 shows an addressing operation to the ROM 2104 of the image processing portion according to this embodiment. In FIG. 16, an up/down counter 2901 counts up/down the Hsync in accordance with the Up/Down signal, and the output from the up/down counter 2901 enters the address of the ROM 2902, which outputs additional information for one bit at every one line of the image signals. The modulator 2105 operates in accordance with the output additional information.

As the Reset signal and the Up/Down signal are given in a timing as shown in FIG. 10, the up/down counter 2901 is initially reset by the Reset signal, then counts up inputs of the Hsync and Mark signals sequentially. After the input of the Mark signal, the Up/Down signal changes to down-count signal, and the up/down counter 2901 counts down the value from the next input. Accordingly, the address number output from the up/down counter 2901 increases from zero by one line, then after the input of the Mark signal, decreases until it becomes zero, at this time, the Coding signal becomes "0", thus the adding operation of the additional information is terminated.

As shown in FIG. 20, the address numbers for referring to the ROM before the mark line to which the Mark signal is supplied and the address numbers after the mark line are symmetrically identical. Only if the mark line is found and reading the additional information is performed with the mark line as the reference, the additional information can be obtained regardless of backward/forward reading direction. Further, the timing signal is repeatedly generated, thus the same additional information is repeatedly added to the same image.

It should be noted that the information stored in the ROM includes check information as well as unique information such as a serial number of the apparatus model. The check information is a code used for assuring reliability of additional information upon reproducing it from an output image. More specifically, the check information is a general check sum or an error detection-correction code using CRC code, and the check information has been calculated from the unique information and stored in the ROM in advance.

Further, upon reading the additional information out of the output image, the dot intervals within an area considered based on the mark line to include the code are measured so as to reproduce the information. At this time, consistency of the information with the check information is examined to confirm the reproduced information as the initial additional information.

According to this embodiment, with respect to an image area where the image density has been judged to be appropriate to the information to be added, the information stored in the ROM is modulated by one line unit and added to the image signals, and a line as a mark indicative of the information adding position is also inserted in the image. Upon extraction of the added information, the corresponding portion can be easily found by this arrangement, further, the added information can be easily reproduced by measuring

Fifth Embodiment

A fifth embodiment of the present invention will be described below.

In the fourth embodiment, the additional information has been stored in the ROM in advance. In this embodiment, the additional information is supplied in another method.

Figure 17:
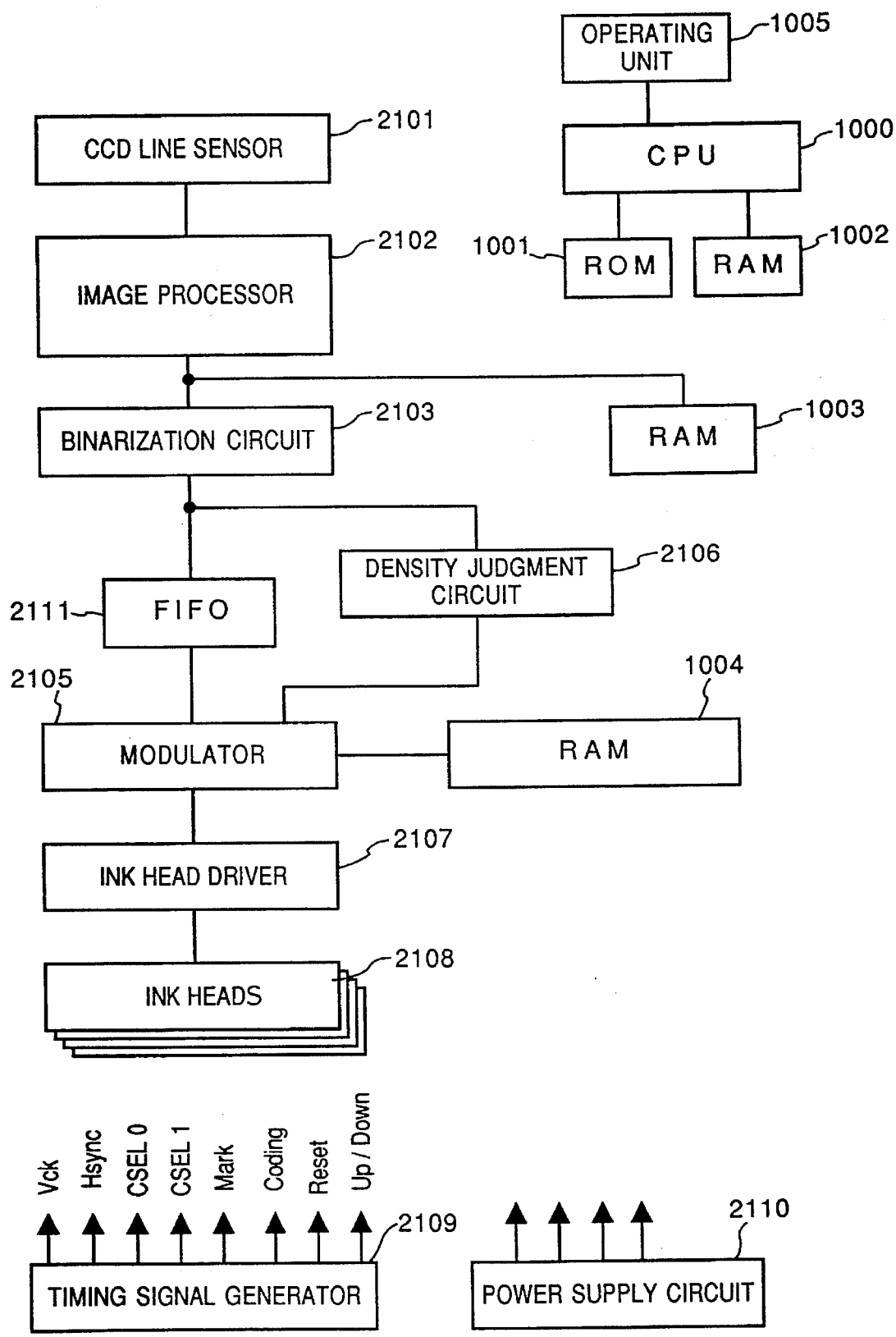
FIG. 17 is a diagram showing a configuration of an image processing portion of a full-color copying apparatus according to a fifth embodiment.

FIG. 17 is a block diagram showing a configuration of an image processing portion of a full-color copying apparatus according to the fifth embodiment. In FIG. 17, elements corresponding to those of the image processing portion as shown in FIG. 8 have the same reference numerals and the explanations will be omitted. The elements different from FIG. 8 will be described below.

In FIG. 17, reference numeral 1000 denotes a CPU; 1001, a ROM in which programs for operations of the CPU 1000 are stored; 1002, a RAM having a storage area as a work area for the CPU 1000; 1004, a RAM in which information to be added is written; and 1005, an operating unit for instructing operations of the apparatus.

The CPU 1000 reads image signals and writes additional information into the RAM 1004. The CPU 1000 can access the RAM 1003 in which the image signals are stored. The RAM 1004 is employed in place of the ROM (FIG. 16) in the fourth embodiment, and the CPU 1000 can freely change the contents of the RAM 1004.

Figure 18:
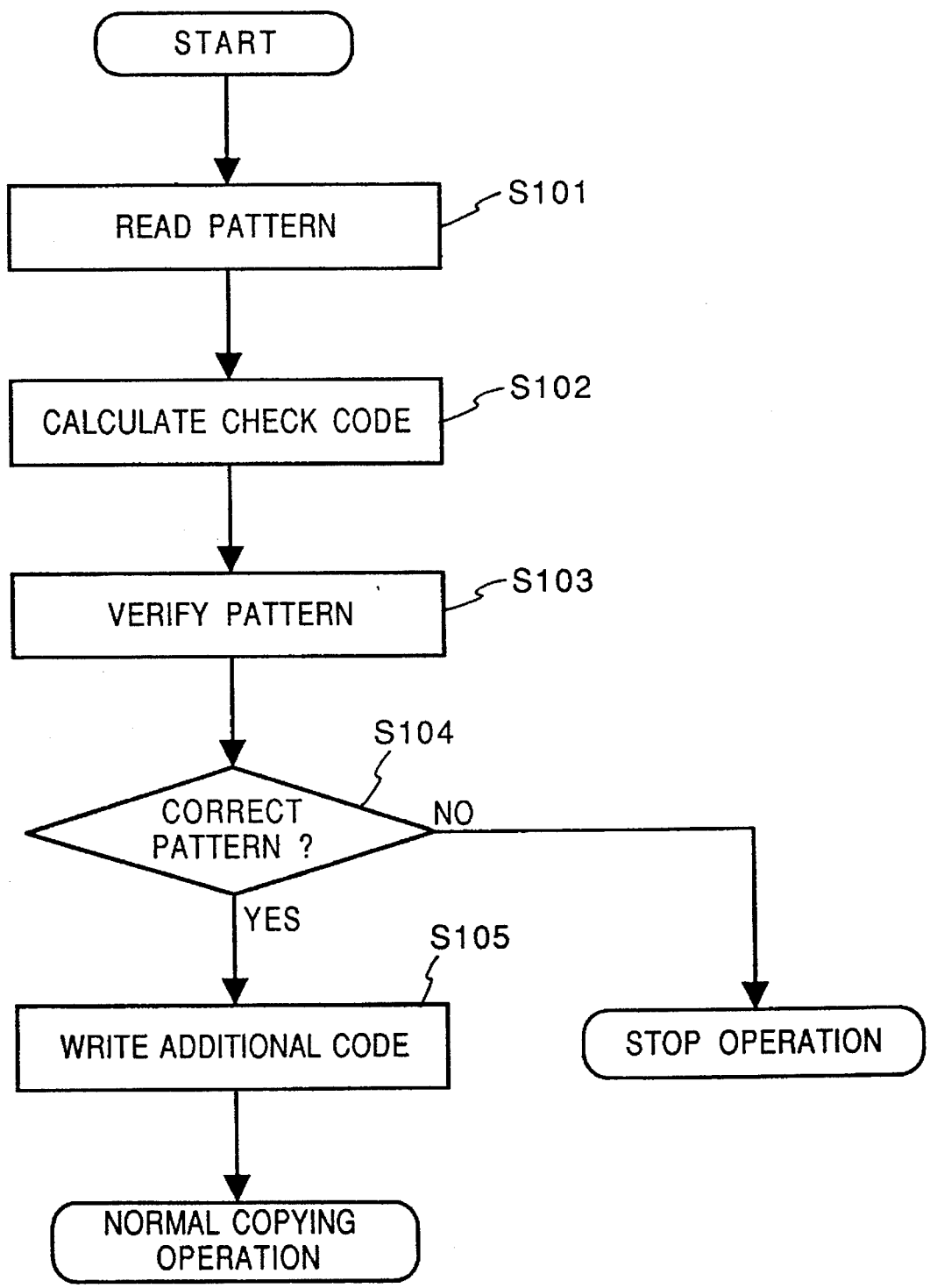
FIG. 18 is a flowchart explaining operations of the apparatus according to the fifth embodiment.

The operations of the full-color copying apparatus having the above construction will be described with reference to FIG. 18 which is a flowchart showing the operations according to the fifth embodiment.

In this full-color copying apparatus, information to be added as a pattern prepared in the apparatus is read before all the copying operations. The pattern is formed such as a bar-code, and is attached on a portion of a normal reference white plate or a portion without the image area of the CCD line sensor. The information read out of this data is written into the RAM 1003 as image data. In step S101, the CPU 1000 accesses the RAM 1003 to extract the information to be added from the read image data.

Next, check data is obtained by calculation from the data portion in the read pattern to examine whether there is a reading error or mutilation to the additional pattern in step S102. In step S103, the calculated check data and the check data portion in the pattern are compared, and whether correct information has been read or not is determined in step S104. If NO, a service-person-call (=a message requiring a maintenance engineer) is displayed and the subsequent operation is stopped. If YES, i.e., it is confirmed that the read information is the correct data, the information to be added is written into the RAM 1004 in step S105, and the process proceeds to normal copying operation.

It should be noted that the above operation should not be necessarily performed at every copying operation. Normally, this operation forms a part of self-diagnosis after electric power is suppled to the apparatus. Further, the copying operation after the information is once set in the RAM 1004 is similar to that in the fourth embodiment and therefore the explanation will be omitted.

Figure 19:
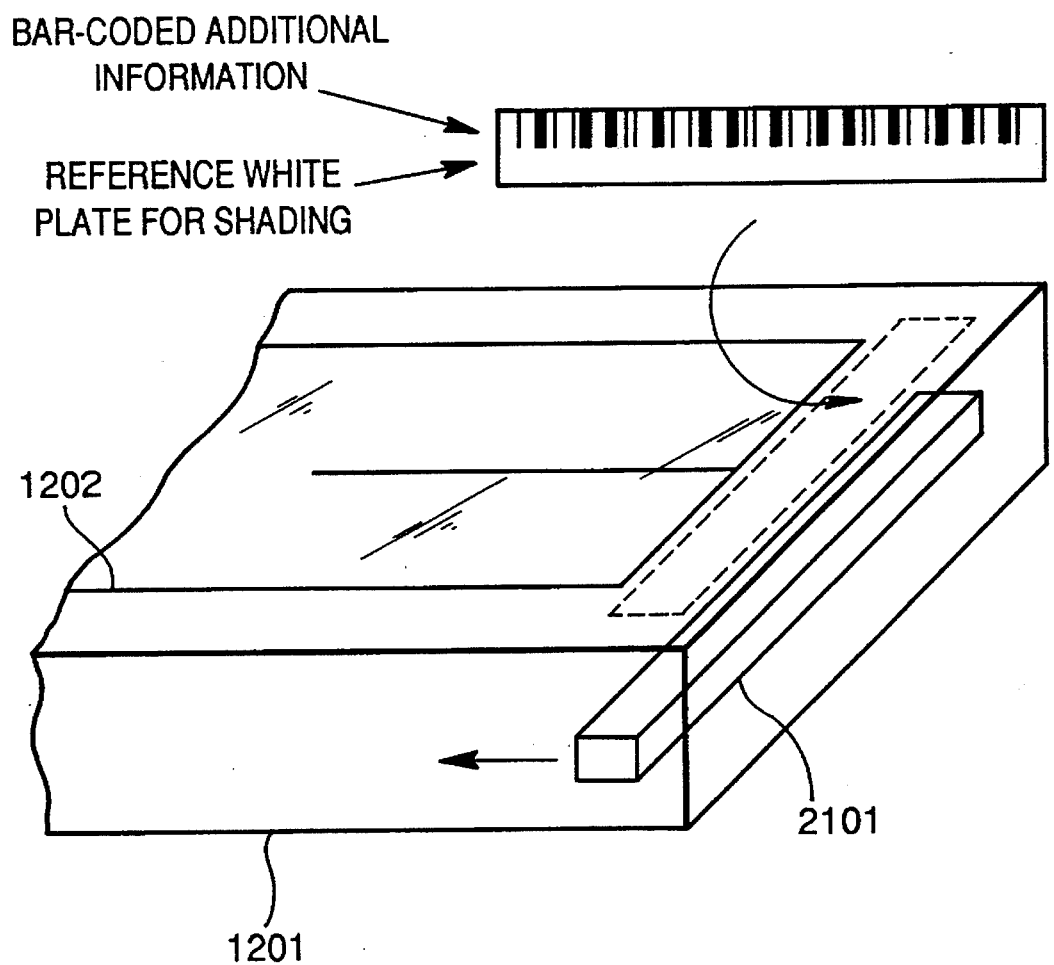
FIG. 19 is a diagram explaining input of additional information according to the fifth embodiment.

FIG. 19 illustrates the additional information attached to a image reading unit 1201 in the full-color copying apparatus of this embodiment. In the image reading unit 1201, a CCD line sensor 2101 scans the inner surface of a platen 1202 on which an original is placed. A reference white plate used for a normal shading operation is arranged around the home-position of the CCD line sensor 2101. The information to be added is written on a portion of the reference white plate using a code readable by the CCD line sensor 2101. As described above, the information is encoded by well-known bar-coding, and the code is read to obtain the information in step S101 in the flowchart of FIG. 18.

In this embodiment, the additional information given as an image pattern is read and set before the copying operations, i.e., the additional information is stored without the image processing portion. This arrangement can maintain the same additional information even when the circuits are exchanged in repairing the apparatus.

It can also be arranged that a part of the additional information is set by a key input means of the operating unit 1005.

According to the present invention, predetermined information is added to binarized image signals by modulating dot intervals, and a mark indicative of the position where the information is added is arranged in the image data, which enables easy specifying the additional information from an output image.

Modification

In the above embodiments, predetermined information is added to image signals, however, if the additional information is written into a RAM table as in the apparatus of the fifth embodiment, the additional information can be altered at process executing time.

For example, if the apparatus incorporates a clock mechanism, date and time of printing the additional information can be encoded and added as well as a serial number of the apparatus. Further, means for identifying a user, i.e., a control card attached to the copying apparatus, such as a magnetic card, an IC card and an ID card can be used together with the additional information to add information of the user.

If the apparatus is a facsimile apparatus, a telephone can be attached to the apparatus, further, the additional information can be supplied more flexibly in the output image.

In the above embodiments, modulation is performed to the entire one line, however, it is not necessarily performed toward the entire line. The modulation of one portion of the line is possible. Further, the direction of modulation is not limited to the reading direction of the CCD line sensor. Even if the modulation is performed in a direction perpendicular to the reading direction of the CCD line sensor, there is no difference in the nature of the present invention.

Further, the changing of dot interval can be performed by methods other than that depending upon odd/even number of dots in the interval.

In the above embodiments, the density judgment is performed based on binarized signals, however, it can be performed using multi-level signals before the binarization.

In the above embodiments, the present invention is applied to a full-color copying apparatus, however, the apparatus is not limited to a copying apparatus, basically any device which outputs by a binary image data can be employed. For example, a facsimile apparatus or a printer can be employed.

In the above embodiments, the CMYK data are serially transmitted. However, if independent binarization circuits for the respective CMYK data and modulators for the respective C, M, Y and K colors are provided, parallel image processing can be achieved.

Further, additional information is not limited to a serial number of the apparatus, it can be information such as time and date of copying operation and an ID code of a user.

In the above embodiments, the dot data to be modulated is binary, however, it can be a multi-level dot data.

In these embodiments, an image reader as an image input means reads an original for generating image data, the input means is not limited to the image reader, other devices such as a still video camera, a video camera and a host computer can be employed.

Further, output means is not limited to the laser-beam printer and the ink-jet printer, other printers such as a thermal-transfer printer and a dot-printer can be employed. Especially, a bubble-jet type printer which discharges an ink utilizing boiling the ink by heat energy can be employed.

Further, a combination of the above embodiments can be included within the concept of the present invention.

The present invention can be applied to a system constituted by a plurality of devices such as a system including a scanner, a host-computer and a printer, or to an apparatus comprising a simple device e.g. a copying apparatus. Furthermore, it goes without saying that the invention is applicable also to a case where the object of the invention is attained by supplying a program to a system or apparatus.

Further, the information addition is performed by dot interval modulation, thus the information is added to the image signals preventing degradation of image quality. As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

generating means for generating a plurality of dot data; and control means for controlling an interval of two dots formed in accordance with the dot data generated by said generating means, wherein the interval controlled by said control means represents a predetermined information which is not included in a dot image formed in accordance with the dot data generated by said generating means.

2. The apparatus according to claim 1, further comprising detecting means for detecting whether the interval is for an odd number of dots or an even number of dots.

3. The apparatus according to claim 1, wherein said control means controls intervals of a plurality of dots so that each of intervals of two neighboring dots is an odd number of dots or an even number of dots.

4. The apparatus according to claim 1, wherein the predetermined information is information for specifying the apparatus.

5. The apparatus according to claim 1, wherein the predetermined information is information for specifying time and date of processing performed by the apparatus.

6. The apparatus according to claim 1, wherein the predetermined information is expressed by binary information.

7. The apparatus according to claim 1, wherein said generating means comprises a CCD line sensor.

8. The apparatus according to claim 1, wherein said generating means comprises a host computer.

9. The apparatus according to claim 1, further comprising image forming means for forming an image on a medium in accordance with the dot data.

10. An image processing method comprising:

a generating step of generating a plurality of dot data; and a control step of controlling an interval of two dots formed in accordance with the dot data generated in said generating step, wherein the interval controlled in said control step represents a predetermined information which is not included in a dot image formed in accordance with the dot data generated in said generating step.

11. An image processing apparatus comprising:

generating means for generating a plurality of kind of color dot data dot-sequentially;

detecting means for detecting an interval of two dots of the same kind of color formed in accordance with the color dot data generated by said generating means; and control means for controlling the interval of the two dots of the same kind of color, wherein the interval controlled by said control means represents a predetermined information which is not included in a dot image in accordance with the color dot data generated by said generating means.

12. The apparatus according to claim 11, wherein said detecting means detects whether the interval is for an odd number of dots or an even number of dots.

13. The apparatus according to claim 12, wherein said control means controls intervals of a plurality of dots of same kind of color so that each of intervals of two neighboring dots is for an odd number of dots or an even number of dots.

14. The apparatus according to claim 11, wherein the predetermined information is information for specifying the apparatus.

15. The apparatus according to claim 11, wherein the predetermined information is information for specifying time and date of processing performed by the apparatus.

16. The apparatus according to claim 11, wherein the predetermined information is expressed by binary information.

17. The apparatus according to claim 11, wherein said generating means comprises a CCD line sensor.

18. The apparatus according to claim 11, wherein said generating means comprises a host computer.

19. The apparatus according to claim 11, further comprising image forming means for forming an image on a medium in accordance with the dot data.

20. An image processing method comprising:

a generating step of generating plural kinds of color dot data dot-sequentially;

a detecting step of detecting an interval of two dots of the same kind of color formed in accordance with the color dot data generated in said generating step; and a control step of controlling the interval of the two dots of the same kind of color, wherein the interval controlled in said control step represents a predetermined information which is not included in a dot image in accordance with the color dot data generated in said generating step.

21. An image processing apparatus comprising:

generating means for generating image data;

judging means for judging whether a level of the image data is in a predetermined range;

adding means for adding a predetermined information on an image represented by the image data; and control means for controlling addition by said adding means in accordance with judgment by said judging means.

22. The apparatus according to claim 21, wherein the predetermined information is information for specifying the apparatus.

23. The apparatus according to claim 21, wherein the predetermined information is information for specifying time and date of processing performed by the apparatus.

24. The apparatus according to claim 21, wherein the predetermined information is expressed by binary information.

25. The apparatus according to claim 21, wherein said generating means comprises a CCD line sensor.

26. The apparatus according to claim 21, wherein said generating means comprises a host computer.

27. An image processing method comprising:

a generating step of generating image data;

a judging step of judging whether a level of the image data is in a predetermined range;

an adding step of adding a predetermined information on an image represented by the image data; and a control step of controlling addition in said adding step in accordance with judgment in said judging step.

28. An image processing apparatus comprising:

generating means for generating image data; and processing means for processing the image data generated by said generating means and outputting a reproduction signal for forming an image, wherein said processing means includes adding means for adding a predetermined information on the image and control means for controlling density of the image after the addition by said adding means so that the density of the image before the addition by said adding means is substantially preserved.

29. The apparatus according to claim 28, wherein the predetermined information is information for specifying the apparatus.

30. The apparatus according to claim 28, wherein the predetermined information is information for specifying time and date of processing performed by the apparatus.

31. The apparatus according to claim 28, wherein the predetermined information is expressed by binary information.

32. The apparatus according to claim 28, wherein said generating means comprises a CCD line sensor.

33. The apparatus according to claim 28, wherein said generating means comprises a host computer.

34. An image processing method comprising:

a generating step of generating image data; and a processing step of processing the image data generated in said generating step and outputting a reproduction signal for forming an image, wherein said processing step includes an adding step of adding a predetermined information on the image and a control step of controlling density of the image after the addition in said adding step so that the density of the image before the addition in said adding step is substantially preserved.

35. The apparatus according to claim 9, wherein said image forming means has an ink-jet type printing head.

36. The apparatus according to claim 35, wherein the ink-jet type printing head includes a bubble-jet type ink head which boils ink by heat energy to form bubbles and eject the ink.

* * * * *

UNITED STATES PATENT AND TRADEMARK OFFICE
CERTIFICATE OF CORRECTION

PATENT NO. : 5,457,540

DATED : October 10, 1995

INVENTOR : KOJI KAJITA

It is certified that errors appear in the above-identified patent and that said Letters Patent is hereby corrected as shown below:

COLUMN 3

Line 41, "an" should read --the--.

COLUMN 4

Line 28, "a" should be deleted; and

Line 38, "a" should be deleted.

COLUMN 5

Line 35, "in" should be deleted.

COLUMN 6

Line 23, "circumstances certain." should read --certain circumstances.--.

COLUMN 7

Line 1, "there for" should read --therefor--.

COLUMN 8

Line 31, "the" (second occurrence) should read --The--.

COLUMN 9

Line 5, "includes" should read --include--.

UNITED STATES PATENT AND TRADEMARK OFFICE
CERTIFICATE OF CORRECTION

PATENT NO. : 5,457,540

DATED : October 10, 1995

INVENTOR : KOJI KAJITA

It is certified that errors appear in the above-identified patent and that said Letters Patent is hereby corrected as shown below:

<u>COLUMN 16</u>

Line 11, "kind" should read --kinds--.

Signed and Sealed this

Fifth Day of March, 1996

*Attest:*

BRUCE LEHMAN

*Attesting Officer*   *Commissioner of Patents and Trademarks*